US012638557B2

(12) United States Patent
Sachkov

(10) Patent No.: US 12,638,557 B2
(45) Date of Patent: May 26, 2026

(54) SCANNER FOR A LIDAR SYSTEM AND LIDAR SYSTEMS AND METHODS INCLUDING A SCANNER

(71) Applicant: YANDEX SELF DRIVING GROUP LLC, Moscow (RU)

(72) Inventor: Andrey Vladimirovich Sachkov, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 1196 days.

(21) Appl. No.: 17/552,807

(22) Filed: Dec. 16, 2021

(65) Prior Publication Data

US 2022/0196809 A1     Jun. 23, 2022

(30) Foreign Application Priority Data

Dec. 22, 2020     (RU) ................................ 2020142431

(51) Int. Cl.
*G01S 7/481*          (2006.01)
*G01S 7/484*          (2006.01)
          (Continued)

(52) U.S. Cl.
CPC ............ *G01S 7/4817* (2013.01); *G01S 7/484* (2013.01); *G01S 17/931* (2020.01); *G02B 26/101* (2013.01); *G02B 26/105* (2013.01)

(58) Field of Classification Search
CPC ..... G01S 7/48–51; G01S 17/89; G02B 26/12; G02B 5/09
See application file for complete search history.

(56) References Cited

U.S. PATENT DOCUMENTS 4,967,076 A * 10/1990 Schuhmacher .... G06K 7/10693
                                                            250/236
5,461,505 A * 10/1995 Nishikawa ........... G02B 26/121
                                                            359/217.1
(Continued)

FOREIGN PATENT DOCUMENTS

EP          0431831 A1     6/1991
WO      2019022304 A1     1/2019

OTHER PUBLICATIONS

European Search Report dated Jun. 28, 2022 issued in respect of the European Patent Application No. 21198630.2.
(Continued)

*Primary Examiner* — Yuqing Xiao
*Assistant Examiner* — Sean C. Grant
(74) *Attorney, Agent, or Firm* — BCF LLP

(57)          ABSTRACT

Scanner for a LIDAR system of an autonomous vehicle, the scanner comprising: a hub component comprising a hub body which is rotational about a hub rotation axis; at least three mirror components moveably connected to the hub component, each mirror component having: a front side having a reflective surface for directing incident light beams; and a back side having a connector for attaching the at least three mirror components to the hub component with the respective reflective surfaces facing outwardly, the connector configured to permit the mirror component to rotate with the hub component and to permit the mirror component to tilt along a mirror tilt axis which is transverse to the hub rotation axis.

17 Claims, 12 Drawing Sheets

(51) Int. Cl.
   *G01S 17/931* (2020.01)
   *G02B 26/10* (2006.01)

(56) References Cited

U.S. PATENT DOCUMENTS

| | | | | | |
|---|---|---|---|---|---|
| 5,793,491 | A | 8/1998 | Wangler et al. | | |
| 6,219,168 | B1 | 4/2001 | Wang | | |
| 7,869,112 | B2 | 1/2011 | Borchers et al. | | |
| 8,072,665 | B2 * | 12/2011 | Lee | G02B 26/101 | |
| | | | | 359/200.1 | |
| 8,130,432 | B2 | 3/2012 | Lee et al. | | |
| 9,618,742 | B1 | 4/2017 | Droz et al. | | |
| 10,048,493 | B2 | 8/2018 | Sugihara | | |
| 10,073,166 | B2 | 9/2018 | Dussan | | |
| 10,101,457 | B1 | 10/2018 | Topliss et al. | | |
| 10,571,552 | B1 | 2/2020 | Gao et al. | | |
| 10,788,572 | B2 | 9/2020 | Hartmann et al. | | |
| 2007/0014318 | A1 * | 1/2007 | Hajjar | G09G 3/2011 | |
| | | | | 348/E9.026 | |
| 2018/0231640 | A1 | 8/2018 | Han et al. | | |
| 2019/0195992 | A1 | 6/2019 | Nabbe | | |
| 2019/0310351 | A1 | 10/2019 | Hughes et al. | | |
| 2020/0049819 | A1 | 2/2020 | Cho et al. | | |
| 2020/0150247 | A1 | 5/2020 | Ledbetter et al. | | |
| 2020/0326413 | A1 | 10/2020 | Zhang | | |

OTHER PUBLICATIONS

Russian Search Report dated May 30, 2022 issued in respect of the counterpart Russian Patent Application No. RU 2020142431.

* cited by examiner

1000

1010

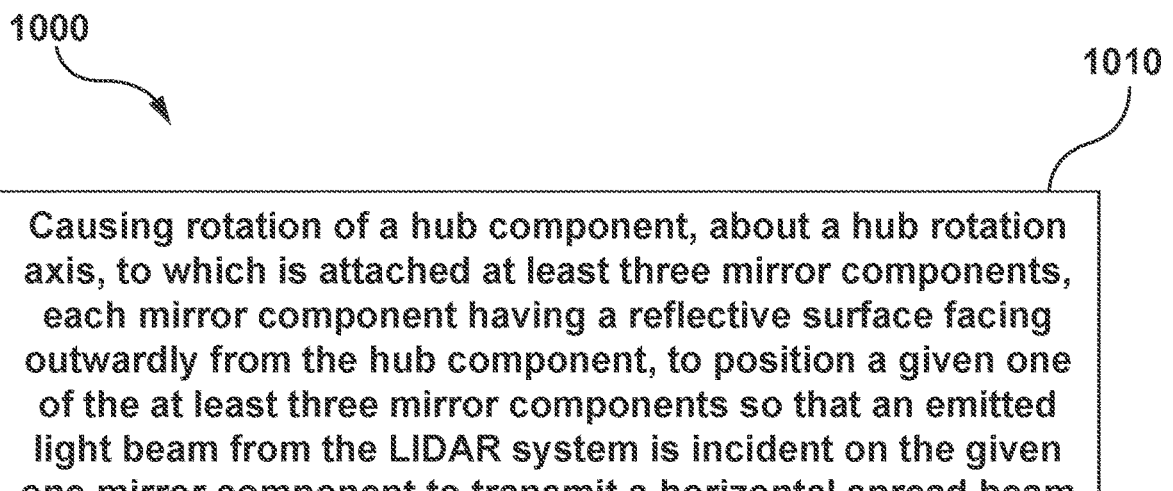

Causing rotation of a hub component, about a hub rotation axis, to which is attached at least three mirror components, each mirror component having a reflective surface facing outwardly from the hub component, to position a given one of the at least three mirror components so that an emitted light beam from the LiDAR system is incident on the given one mirror component to transmit a horizontal spread beam

1020

Causing a tilting of the given one mirror component, relative to the hub component, by a predetermined first tilt angle to transmit a first vertical spread beam

FIGURE 14

SCANNER FOR A LIDAR SYSTEM AND LIDAR SYSTEMS AND METHODS INCLUDING A SCANNER

CROSS-REFERENCE

The present application claims priority to Russian Patent Application No. 2020142431, entitled "Scanner for a Lidar System and Lidar Systems and Methods Including a Scanner", filed Dec. 22, 2020, the entirety of which is incorporated herein by reference.

TECHNICAL FIELD

The present technology relates generally to Light Detection and Ranging (LiDAR) systems and methods for detecting objects in a surrounding environment of an autonomous vehicle; and in particular, to LiDAR systems and methods for detecting objects in a desired region of interest in the surrounding environment.

BACKGROUND

Several computer-based navigation systems that are configured for aiding navigation and/or control of vehicles have been proposed and implemented in the prior art. These systems range from more basic map-aided localization-based solutions—i.e. use of a computer system to assist a driver in navigating a route from a starting point to a destination point; to more complex ones such as computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control systems implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control systems, which systems, upon detection of the vehicle (or other obstacles) in front of the moving vehicle, slow down or stop the vehicle.

Some of the more advanced systems provide for a fully autonomous driving of the vehicle without direct control from the operator (i.e. the driver). These autonomously driven vehicles include systems that can cause the vehicle to accelerate, brake, stop, change lane and self-park.

One of the main technical challenges in implementing the above systems is the ability to detect objects located around the vehicle. In one example, the systems may need the ability to detect the vehicle in front of the present vehicle (the present vehicle having the system onboard), which vehicle in front may pose a risk/danger to the present vehicle and may require the system to take a corrective measure, be it braking or otherwise changing speed, stopping or changing lanes. In another example, the systems may need to detect a pedestrian or animal crossing in front of the vehicle or otherwise in a surrounding environment of the vehicle.

LiDAR-based object detection generally comprises transmitting beams of light towards a region of interest, and detecting reflected light beams, such as from objects in the region of interest, to generate a representation of the region of interest including any objects. Lasers emitting pulses of light within a narrow wavelength are often used as the radiation (light) source. The position and distance of the object can be computed using inter alia Time of Flight calculations of the emitted and detected light beam. By computing such positions as "data points", a digital multi-dimensional representation of the surroundings can be generated.

Generally, as for the physics of LiDAR-based object detection, one approach currently known in the art is based on utilizing a pulsed emission and is referred to as Time of Flight (ToF) LiDAR systems. In ToF LiDAR systems, each LiDAR sensor emits a short pulse of a predetermined wavelength and further registers time that it takes for the pulse to scatter from a surrounding object and to return to the respective LiDAR sensor. By rotating the ToF LiDAR system, positioned at the top of the vehicle, comprising a plurality of such LiDAR sensors, by 360 degrees, a 3D representation of the surroundings of the vehicle can be generated.

The 3D representation is formed in part by reflected beams received by the LIDAR which generates data points representative of the surrounding objects. These points form clouds that represent the surrounding environment and form a 3D map. Each point in the point cloud is associated with coordinates in a coordinate space. Additionally, each point can be associated with some additional information such as the distance to the object from the self-driving vehicle. Other information may be associated with the points in the point cloud.

The more points with acceptable quality are obtained, the better. In this case, a computer of the self-driving vehicle can perform tasks of various cognitive complexity using the point cloud, e.g. filtering, clustering or sampling of the points, merging of the point clouds, recognizing the object, etc. The quality of performing these separate tasks affects the general quality of localization and navigation of the self-driving vehicle. Precise information on the surrounding objects improves the safety of driving.

It is desired to improve the volume of obtained points within a certain time frame without compromising other aspects of the LiDAR system such as size, cost and complexity.

SUMMARY

Therefore, there is a need for systems and methods which avoid, reduce or overcome the limitations of the prior art.

Developers have noted that received data points within a certain time frame can be increased by reducing a dead time between transmission of different pulses of light to the region of interest. In this respect, a scanner has been developed which includes multiple mirrors for reflecting light from the light source, the mirrors being configured to scan in both horizontal and vertical directions, and which can reduce a dead time between transmission of the different pulses of light.

Certain prior art approaches have been proposed regarding scanners which include mirrors.

U.S. Pat. No. 8,130,432 describes a space scanner for a self-control moving object. The space scanner has a structure in which a reflective mirror is rotated and tilted. Thus, the space scanner can scan a moving object in horizontal and vertical directions to secure spatial-data, thereby performing a self-control movement.

United States Patent Application Publication US2020049819 describes a three-dimensional space scanner configured so that a reflecting mirror is rotated and tilted so as to scan a mobile object in a horizontal as well as vertical direction, thereby obtaining spatial data.

United States Patent Application Publication US2018231640A describes a LIDAR device including a light source to emit a light beam to scan a range of orientations associated with a target scanning zone. The LIDAR device further includes a first microelectromechanical system (MEMS) mirror configured to receive and redirect the light beam towards the target scanning zone. The first MEMs mirror is configured to tilt vertically and horizontally to redirect the light beam in a plurality of angles. The LIDAR device further includes a light detector to receive the light beam reflected from one or more objects located within the target scanning zone. The first MEMS mirror tilts multiple directions with respect to the light source to allow the light source to emit the light beam and the light detector to receive the reflected light beam to obtain multiple angular resolutions of the one or more objects.

In accordance with a first broad aspect of the present technology, there is provided a scanner for a LIDAR system of an autonomous vehicle, the scanner comprising: a hub component comprising a hub body which is rotational about a hub rotation axis; at least three mirror components moveably connected to the hub component, each mirror component having: a front side having a reflective surface for directing incident light beams; and a back side having a connector for attaching the at least three mirror components to the hub component with the respective reflective surfaces facing outwardly, the connector configured to permit the mirror component to rotate with the hub component and to permit the mirror component to tilt along a mirror tilt axis which is transverse to the hub rotation axis.

In certain embodiments, the hub component and the at least three mirror components form a polyhedral configuration with the at least three mirror components forming at least three sides of the polyhedron.

In certain embodiments, the given reflective surfaces of the at least three mirror components have a side-by-side configuration when connected to the hub component and are angled with respect to one another.

In certain embodiments, the at least three mirror components are positioned circumferentially with respect to the hub component about the hub rotation axis.

In certain embodiments, the respective mirror tilt axes of the plurality of mirror components are positioned about a circumference of the hub component and lie on the same plane.

In certain embodiments, the connector of each mirror component forms part of a hinge joint.

In certain embodiments, the at least three mirror components comprise 3, 4, 5, 6, 7 or 8 mirror components.

In certain embodiments, the at least three mirror components comprise six mirror components positioned circumferentially about the hub component to form a hexagonal prism configuration having six sides, with the reflective surfaces of the six mirror components forming the six sides of the hexagonal prism.

In certain embodiments, movement of the mirror component about the mirror tilt axis defines a tilt angle range comprising an upper tilt angle relative to a reference plane and a lower tilt angle relative to the reference plane, and wherein the tilt angle range of each mirror component may be the same or different to one another.

In certain embodiments, the method further comprises a vertical movement driver for changing a tilt angle or a tilt angle range about the mirror tilt axis of each mirror of the at least three mirror components, wherein the vertical movement driver is configured to change the tilt angle of each mirror.

In certain embodiments, the vertical movement driver comprises a base component, having a radius which varies along its length, positioned circumferentially around a base of the hub component, the base component configured to reciprocate parallel to the hub rotation axis whilst being in contact with the back side of each of the at least three mirror components, to move the at least three mirror components about their respective mirror tilt axes as the base component reciprocates.

In certain embodiments, the scanner further comprises a roller provided at the back side of each of the at least three mirror components, the roller arranged to rotate about a roller rotation axis, and along a surface of the base component when the hub component rotates.

In certain embodiments, the roller rotation axis is parallel to the surface of the base component.

In certain embodiments, the base component is cone shaped and has a diameter at a lower end which is wider than the diameter at a higher end, such that moving the base component upwardly, causes the tilt angle, relative to a reference plane, of the mirror component to increase.

In certain embodiments, the hub component is communicatively coupled to a controller of the LIDAR system, the controller configured to control the rotation of the hub component.

In certain embodiments, the vertical movement driver is communicatively coupled to a controller of the LIDAR system, the controller configured to control a movement of the vertical movement driver which can cause the mirror component to tilt about the mirror tilt axis.

In certain embodiments, the base component is communicatively coupled to a controller of the LIDAR system, the controller configured to control the reciprocating movement of the vertical movement driver which can cause the mirror component to tilt about the mirror tilt axis.

From another aspect, there is provided a LIDAR system for detecting objects in a surrounding environment of an autonomous vehicle, the LIDAR system comprising: a hub component comprising a hub body which is rotational about a hub rotation axis; at least three mirror components moveably connected to the hub component, each mirror component having: a front side having a reflective surface for directing incident light beams; and a back side having a connector for attaching the at least three mirror components to the hub component with the respective reflective surfaces facing outwardly, the connector configured to permit the mirror component to rotate with the hub component and to permit the mirror component to tilt along a mirror tilt axis which is transverse to the hub rotation axis.

In certain embodiments, the LIDAR system further comprises a controller communicatively coupled to the scanner, the controller configured to cause rotation of the hub component about the rotation axis and/or tilting movement of the at least three mirror components about the respective mirror tilt axis.

In certain embodiments, the LIDAR system further comprises a receiver for receiving reflected output beams from the region of interest.

From another aspect, there is provided a method of generating a scan pattern in a region of interest by a scanner of a LIDAR system of an autonomous vehicle, the method executed by a controller of the LIDAR system which is communicatively coupled to the scanner, the method comprising: the controller causing rotation of a hub component, about a hub rotation axis, to which is attached at least three mirror components, each mirror component having a reflective surface facing outwardly from the hub component, to position a given one of the at least three mirror components so that an emitted light beam from the LIDAR system is incident on the given one mirror component to transmit a horizontal spread beam; the controller causing a tilting of the given one mirror component, relative to the hub component, by a predetermined first tilt angle to transmit a first vertical spread beam.

In certain embodiments, the method comprises the controller causing a further rotation of the hub component about the hub rotation axis to position a given other one of the at least three mirror components so that another emitted light beam from the LIDAR system is incident on the given other one of the at least three mirror components.

In certain embodiments, the method comprises the controller causing a tilting of the given other one mirror component, relative to the hub component, by a predetermined second tilt angle to transmit a second vertical spread beam, wherein the predetermined first tilt angle and the predetermined second tilt angle may be the same or different.

In certain embodiments, the method further comprises the controller coordinating the emission of the light beam with the rotation of the hub component so that sequential light beams are incident on different mirror components.

From a yet further aspect, there is provided a scanner for a LIDAR system of an autonomous vehicle, the scanner comprising: reflective surfaces positioned circumferentially about a rotational hub component and rotational with the hub component; each reflective surface being configured to tilt along a mirror tilt axis which is transverse to a hub rotation axis; a vertical movement driver configured to cause the reflective surface to tilt.

Certain embodiments of the present system and method can achieve a reduction of dead time during operation of the LIDAR. The plurality of reflective surfaces can mean that a different reflective surface is presented to a transmitted light beam by movement of the hub which can be coordinated with the transmission of the light beam. In certain embodiments, the plurality of reflective surfaces are positioned circumferentially about the hub component and rotation of the hub component can present a different reflective surface to the light beam. In certain embodiments, there are 3, 4, 6 or 8 reflective surfaces.

In certain embodiments of the present system and method, a fast transfer of scanning between upper and lower parts of the FOV can be achieved through tilting of the reflective surfaces. Furthermore, multiple spaced reflective surfaces can be tilted concurrently, such as in pairs or triplets.

In certain embodiments of the present system and method, a size of the LiDAR may be reduced or minimized compared to conventional LiDAR systems due to the hub component and reflective surface component. Static mirrors are not required.

In certain embodiments of the present system and method, there is no requirement for wireless electrical connections between components as there are no circulating/rotating electronic components requiring a wireless connection. Therefore, a reliability of the LiDAR methods and systems may be enhanced due to a lack of wireless data transmission.

In the context of the present specification, the term "light source" broadly refers to any device configured to emit radiation such as a radiation signal in the form of a beam, for example, without limitation, a light beam including radiation of one or more respective wavelengths within the electromagnetic spectrum. In one example, the light source can be a "laser source". Thus, the light source could include a laser such as a solid-state laser, laser diode, a high power laser, or an alternative light source such as, a light emitting diode (LED)-based light source. Some (non-limiting) examples of the laser source include: a Fabry-Perot laser diode, a quantum well laser, a distributed Bragg reflector (DBR) laser, a distributed feedback (DFB) laser, a fiber-laser, or a vertical-cavity surface-emitting laser (VCSEL). In addition, the laser source may emit light beams in differing formats, such as light pulses, continuous wave (CW), quasi-CW, and so on. In some non-limiting examples, the laser source may include a laser diode configured to emit light at a wavelength between about 650 nm and 1150 nm. Alternatively, the light source may include a laser diode configured to emit light beams at a wavelength between about 800 nm and about 1000 nm, between about 850 nm and about 950 nm, between about 1300 nm and about 1600 nm, or in between any other suitable range. Unless indicated otherwise, the term "about" with regard to a numeric value is defined as a variance of up to 10% with respect to the stated value.

In the context of the present specification, an "output beam" may also be referred to as a radiation beam, such as a light beam, that is generated by the radiation source and is directed downrange towards a region of interest. The output beam may have one or more parameters such as: beam duration, beam angular dispersion, wavelength, instantaneous power, photon density at different distances from light source, average power, beam power intensity, beam width, beam repetition rate, beam sequence, pulse duty cycle, wavelength, or phase etc. The output beam may be unpolarized or randomly polarized, may have no specific or fixed polarization (e.g., the polarization may vary with time), or may have a particular polarization (e.g., linear polarization, elliptical polarization, or circular polarization).

In the context of the present specification, an "input beam" is radiation or light entering the system, generally after having been reflected from one or more objects in the ROI. The "input beam" may also be referred to as a radiation beam or light beam. By reflected is meant that at least a portion of the output beam incident on one or more objects in the ROI, bounces off the one or more objects. The input beam may have one or more parameters such as: time-of-flight (i.e., time from emission until detection), instantaneous power (e.g., power signature), average power across entire return pulse, and photon distribution/signal over return pulse period etc. Depending on the particular usage, some radiation or light collected in the input beam could be from sources other than a reflected output beam. For instance, at least some portion of the input beam could include light-noise from the surrounding environment (including scattered sunlight) or other light sources exterior to the present system.

In the context of the present specification, the term "surroundings" or "environment" of a given vehicle refers to an area or a volume around the given vehicle including a portion of a current environment thereof accessible for scanning using one or more sensors mounted on the given vehicle, for example, for generating a 3D map of the such surroundings or detecting objects therein.

In the context of the present specification, a "Region of Interest" may broadly include a portion of the observable environment of a LiDAR system in which the one or more objects may be detected. It is noted that the region of interest of the LiDAR system may be affected by various conditions such as but not limited to: an orientation of the LiDAR system (e.g. direction of an optical axis of the LiDAR system); a position of the LiDAR system with respect to the environment (e.g. distance above ground and adjacent topography and obstacles); operational parameters of the LiDAR system (e.g. emission power, computational settings, defined angles of operation), etc. The ROI of LIDAR system may be defined, for example, by a plane angle or a solid angle. In one example, the ROI may also be defined within a certain distance range (e.g. up to 200 m or so).

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

FIG. 14 illustrates a flowchart of a method for detecting objects in a region of interest, in accordance with various non-limiting embodiments of the present technology;

DETAILED DESCRIPTION

Figure 1:
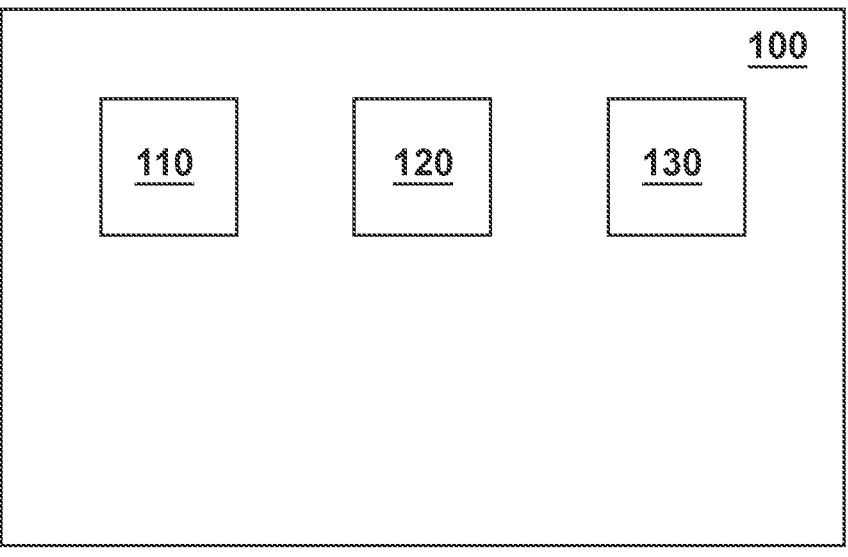
FIG. 1 depicts a schematic diagram of an example computer system configurable for implementing certain non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a schematic diagram of a computer system 100 suitable for use with some implementations of the present technology. The computer system 100 includes various hardware components including one or more single or multi-core processors collectively represented by a processor 110, a solid-state drive 120, and a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, localization modules, and the like.

Networked Computing Environment

Figure 2:
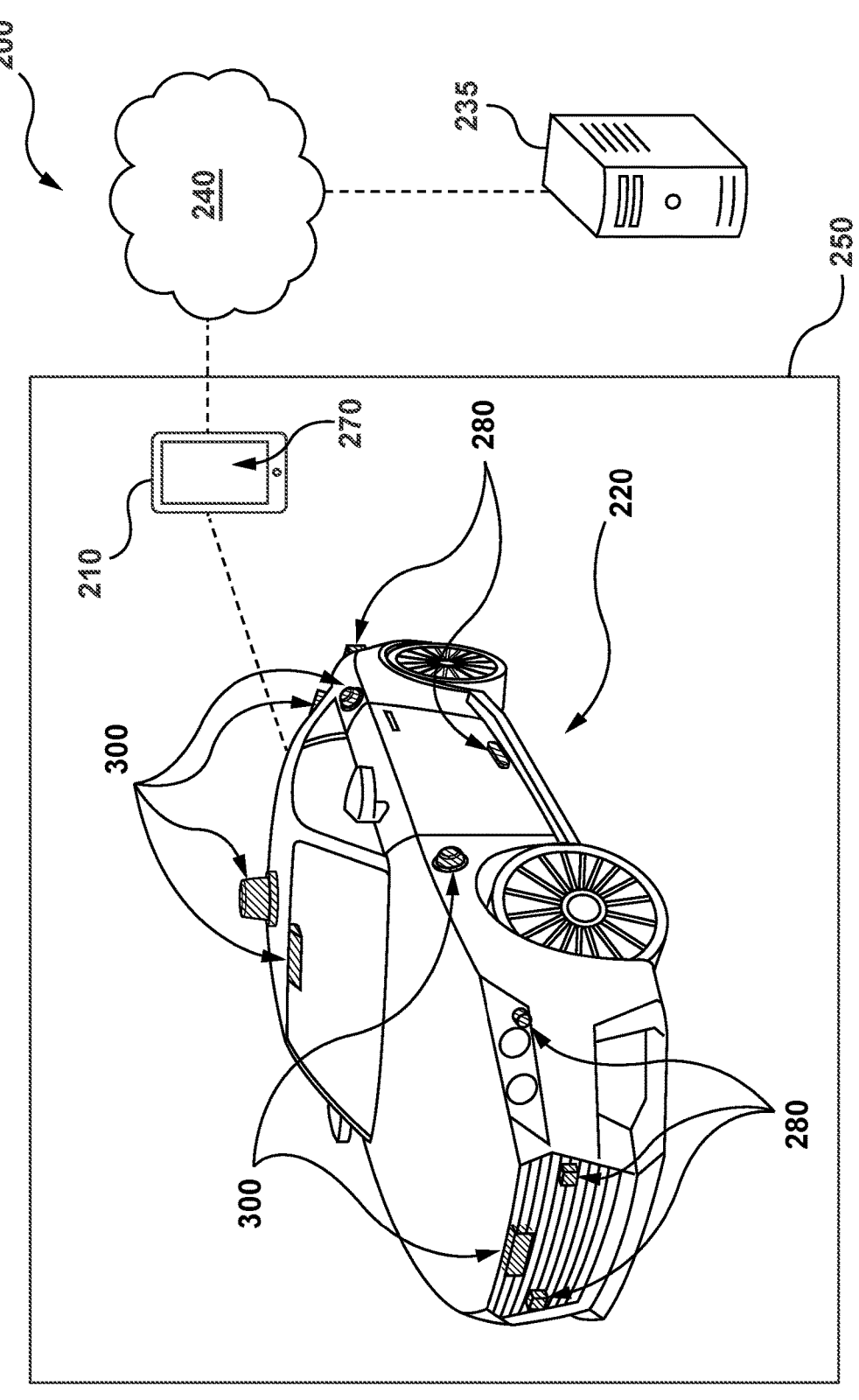
FIG. 2 depicts a schematic diagram of a networked computing environment being suitable for use with certain non-limiting embodiments of the present technology.

With reference to FIG. 2, there is depicted a networked computing environment 200 suitable for use with some non-limiting embodiments of the present technology. The networked computing environment 200 includes an electronic device 210 associated with a vehicle 220 and/or associated with a user (not depicted) who is associated with the vehicle 220 (such as an operator of the vehicle 220). The networked computing environment 200 also includes a server 235 in communication with the electronic device 210 via a communication network 240 (e.g. the Internet or the like, as will be described in greater detail herein below).

In some non-limiting embodiments of the present technology, the networked computing environment 200 could include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, to which the electronic device 210 is associated, could be any transportation vehicle, for leisure or otherwise, such as a private or commercial car, truck, motorbike or the like. Although the vehicle 220 is depicted as being a land vehicle, this may not be the case in each and every non-limiting embodiment of the present technology. For example, in certain non-limiting embodiments of the present technology, the vehicle 220 may be a watercraft, such as a boat, or an aircraft, such as a flying drone.

The vehicle 220 may be user operated or a driver-less vehicle. In some non-limiting embodiments of the present technology, it is contemplated that the vehicle 220 could be implemented as a Self-Driving Car (SDC). It should be noted that specific parameters of the vehicle 220 are not limiting, these specific parameters including for example: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

According to the present technology, the implementation of the electronic device 210 is not particularly limited. For example, the electronic device 210 could be implemented as a vehicle engine control unit, a vehicle CPU, a vehicle navigation device (e.g. TomTom™, Garmin™), a tablet, a personal computer built into the vehicle 220, and the like. Thus, it should be noted that the electronic device 210 may or may not be permanently associated with the vehicle 220. Additionally or alternatively, the electronic device 210 could be implemented in a wireless communication device such as a mobile telephone (e.g. a smart-phone or a radio-phone). In certain embodiments, the electronic device 210 has a display 270.

The electronic device 210 could include some or all of the components of the computer system 100 depicted in FIG. 1, depending on the particular embodiment. In certain embodiments, the electronic device 210 is an on-board computer device and includes the processor 110, the solid-state drive 120 and the memory 130. In other words, the electronic device 210 includes hardware and/or software and/or firmware, or a combination thereof, for processing data as will be described in greater detail below.

In some non-limiting embodiments of the present technology, the communication network 240 is the Internet. In alternative non-limiting embodiments of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the electronic device 210 and the communication network 240, the implementation of which will depend, inter alia, on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links may include, but are not limited to, a 3G communication network link, a 4G communication network link, and the like. The communication network 240 may also use a wireless connection with the server 235.

In some embodiments of the present technology, the server 235 is implemented as a computer server and could include some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 235 is a single server. In alternative non-limiting embodiments of the present technology, the functionality of the server 235 may be distributed and may be implemented via multiple servers (not shown).

In some non-limiting embodiments of the present technology, the processor 110 of the electronic device 210 could be in communication with the server 235 to receive one or more updates. Such updates could include, but are not limited to, software updates, map updates, routes updates, weather updates, and the like. In some non-limiting embodiments of the present technology, the processor 110 can also be configured to transmit to the server 235 certain operational data, such as routes travelled, traffic data, performance data, and the like. Some or all such data transmitted between the vehicle 220 and the server 235 may be encrypted and/or anonymized.

It should be noted that a variety of sensors and systems may be used by the electronic device 210 for gathering information about surroundings 250 of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may include various optical systems including, inter alia, one or more camera-type sensor systems that are mounted to the vehicle 220 and communicatively coupled to the processor 110 of the electronic device 210. Broadly speaking, the one or more camera-type sensor systems may be configured to gather image data about various portions of the surroundings 250 of the vehicle 220. In some cases, the image data provided by the one or more camera-type sensor systems could be used by the electronic device 210 for performing object detection procedures. For example, the electronic device 210 could be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 could include one or more radar-type sensor systems that are mounted to the vehicle 220 and communicatively coupled to the processor 110. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220, such data potentially being representative of a distance of objects from the radar-type sensor system, orientation of objects, velocity and/or speed of objects, and the like.

It should be noted that the plurality of sensor systems 280 could include additional types of sensor systems to those non-exhaustively described above and without departing from the scope of the present technology.

LiDAR System

According to the present technology and as is illustrated in FIG. 2, the vehicle 220 is equipped with at least one Light Detection and Ranging (LiDAR) system, such as a LiDAR system 300, for gathering information about surroundings 250 of the vehicle 220. While only described herein in the context of being attached to the vehicle 220, it is also contemplated that the LiDAR system 300 could be a stand alone operation or connected to another system.

Depending on the embodiment, the vehicle 220 could include more or fewer LiDAR systems 300 than illustrated.

Depending on the particular embodiment, choice of inclusion of particular ones of the plurality of sensor systems 280 could depend on the particular embodiment of the LiDAR system 300. The LiDAR system 300 could be mounted, or retrofitted, to the vehicle 220 in a variety of locations and/or in a variety of configurations.

For example, depending on the implementation of the vehicle 220 and the LiDAR system 300, the LiDAR system 300 could be mounted on an interior, upper portion of a windshield of the vehicle 220. Nevertheless, as illustrated in FIG. 2, other locations for mounting the LiDAR system 300 are within the scope of the present disclosure, including on a back window, side windows, front hood, rooftop, front grill, front bumper or the side of the vehicle 220. In some cases, the LiDAR system 300 can even be mounted in a dedicated enclosure mounted on the top of the vehicle 220.

In some non-limiting embodiments, such as that of FIG. 2, a given one of the plurality of LiDAR systems 300 is mounted to the rooftop of the vehicle 220 in a rotatable configuration. For example, the LiDAR system 300 mounted to the vehicle 220 in a rotatable configuration could include at least some components that are rotatable 360 degrees about an axis of rotation of the given LiDAR system 300. When mounted in rotatable configurations, the given LiDAR system 300 could gather data about most of the portions of the surroundings 250 of the vehicle 220.

In some non-limiting embodiments of the present technology, such as that of FIG. 2, the LiDAR systems 300 is mounted to the side, or the front grill, for example, in a non-rotatable configuration. For example, the LiDAR system 300 mounted to the vehicle 220 in a non-rotatable configuration could include at least some components that are not rotatable 360 degrees and are configured to gather data about pre-determined portions of the surroundings 250 of the vehicle 220.

Irrespective of the specific location and/or the specific configuration of the LiDAR system 300, it is configured to capture data about the surroundings 250 of the vehicle 220 used, for example, for building a multi-dimensional map of objects in the surroundings 250 of the vehicle 220. Details relating to the configuration of the LiDAR systems 300 to capture the data about the surroundings 250 of the vehicle 220 will now be described.

It should be noted that although in the description provided herein the LiDAR system 300 is implemented as a Time of Flight LiDAR system—and as such, includes respective components suitable for such implementation thereof—other implementations of the LiDAR system 300 are also possible without departing from the scope of the present technology. For example, in certain non-limiting embodiments of the present technology, the LiDAR system 300 may also be implemented as a Frequency-Modulated Continuous Wave (FMCW) LiDAR system according to one or more implementation variants and based on respective components thereof as disclosed in a co-owned U.S. patent application Ser. No. 17/329,255 filed May 25, 2021 and entitled "LiDAR DETECTION METHODS AND SYSTEMS"; the content of which is hereby incorporated by reference in its entirety.

Figure 3:
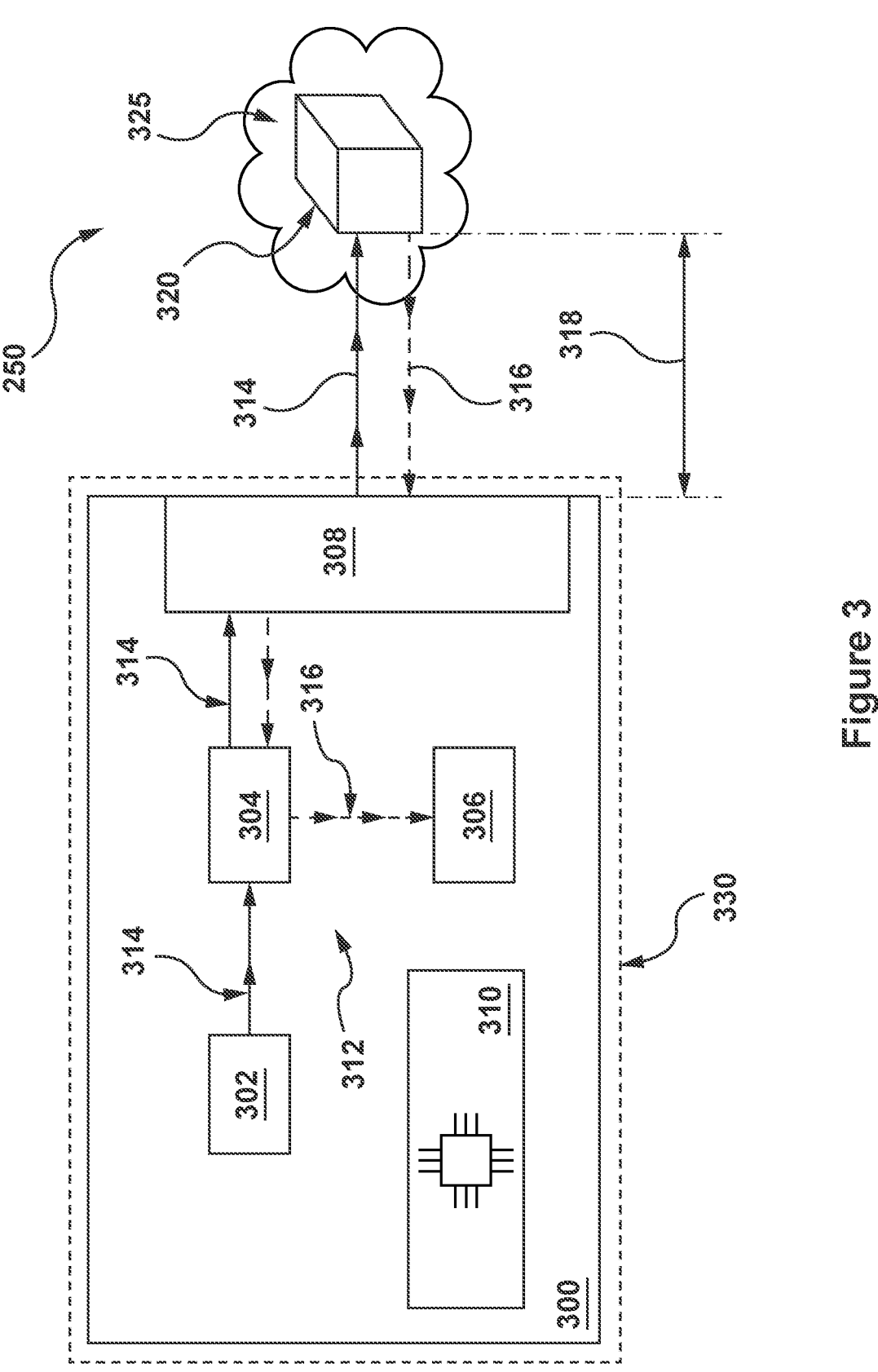
FIG. 3 depicts a schematic diagram of an example LiDAR system implemented in accordance with certain non-limiting embodiments of the present technology.

With reference to FIG. 3, there is depicted a schematic diagram of one particular embodiment of the LiDAR system 300 implemented in accordance with certain non-limiting embodiments of the present technology.

Broadly speaking, the LiDAR system 300 includes a variety of internal components including, but not limited to: (i) a light source 302 (also referred to as a "laser source" or a "radiation source"), (ii) a beam splitting element 304, (iii)

a scanner unit 308 (also referred to as a "scanner", and "scanner assembly"), (iv) a receiving unit 306 (also referred to herein as a "detection system", "receiving assembly", or a "detector"), and (v) a controller 310. It is contemplated that in addition to the components non-exhaustively listed above, the LiDAR system 300 could include a variety of sensors (such as, for example, a temperature sensor, a moisture sensor, etc.) which are omitted from FIG. 3 for sake of clarity.

In certain non-limiting embodiments of the present technology, one or more of the internal components of the LiDAR system 300 are disposed in a common housing 330 as depicted in FIG. 3. In some embodiments of the present technology, the controller 310 could be located outside of the common housing 330 and communicatively connected to the components therein.

Generally speaking, the LiDAR system 300 operates as follows: the light source 302 of the LiDAR system 300 emits pulses of light, forming an output beam 314; the scanner unit 308 scans the output beam 314 across the surroundings 250 of the vehicle 220 for locating/capturing data of a priori unknown objects (such as an object 320) therein, for example, for generating a multi-dimensional map of the surroundings 250 where objects (including the object 320) are represented in a form of one or more data points. The light source 302 and the scanner unit 308 will be described in more detail below.

As certain non-limiting examples, the object 320 may include all or a portion of a person, vehicle, motorcycle, truck, train, bicycle, wheelchair, pushchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Further, let it be assumed that the object 320 is located at a distance 318 from the LiDAR system 300. Once the output beam 314 reaches the object 320, the object 320 generally reflects at least a portion of light from the output beam 314, and some of the reflected light beams may return back towards the LiDAR system 300, to be received in the form of an input beam 316. By reflecting, it is meant that at least a portion of light beam from the output beam 314 bounces off the object 320. A portion of the light beam from the output beam 314 may be absorbed or scattered by the object 320.

Accordingly, the input beam 316 is captured and detected by the LiDAR system 300 via the receiving unit 306. In response, the receiving unit 306 is then configured to generate one or more representative data signals. For example, the receiving unit 306 may generate an output electrical signal (not depicted) that is representative of the input beam 316. The receiving unit 306 may also provide the so-generated electrical signal to the controller 310 for further processing. Finally, by measuring a time between emitting the output beam 314 and receiving the input beam 316 the distance 318 to the object 320 is calculated by the controller 310.

As will be described in more detail below, the beam splitting element 304 is utilized for directing the output beam 314 from the light source 302 to the scanner unit 308 and for directing the input beam 316 from the scanner unit to the receiving unit 306.

Use and implementations of these components of the LiDAR system 300, in accordance with certain non-limiting embodiments of the present technology, will be described immediately below.

Light Source

The light source 302 is communicatively coupled to the controller 310 and is configured to emit light having a given operating wavelength. To that end, in certain non-limiting embodiments of the present technology, the light source 302 could include at least one laser pre-configured for operation at the given operating wavelength. The given operating wavelength of the light source 302 may be in the infrared, visible, and/or ultraviolet portions of the electromagnetic spectrum. For example, the light source 302 may include at least one laser with an operating wavelength between about 650 nm and 1150 nm. Alternatively, the light source 302 may include a laser diode configured to emit light at a wavelength between about 800 nm and about 1000 nm, between about 850 nm and about 950 nm, or between about 1300 nm and about 1600 nm. In certain other embodiments, the light source 302 could include a light emitting diode (LED).

The light source 302 of the LiDAR system 300 is generally an eye-safe laser, or put another way, the LiDAR system 300 may be classified as an eye-safe laser system or laser product. Broadly speaking, an eye-safe laser, laser system, or laser product may be a system with some or all of: an emission wavelength, average power, peak power, peak intensity, pulse energy, beam size, beam divergence, exposure time, or scanned output beam such that emitted light from this system presents little or no possibility of causing damage to a person's eyes.

According to certain non-limiting embodiments of the present technology, the operating wavelength of the light source 302 may lie within portions of the electromagnetic spectrum that correspond to light produced by the Sun. Therefore, in some cases, sunlight may act as background noise, which can obscure the light signal detected by the LiDAR system 300. This solar background noise can result in false-positive detections and/or may otherwise corrupt measurements of the LiDAR system 300. Although it may be feasible in some cases to increase a Signal-to-Noise Ratio (SNR) of the LiDAR system 300 by increasing the power level of the output beam 314, this may not be desirable in at least some situations. For example, it may not in some implementations be desirable to increase power levels of the output beam 314 to levels beyond eye-safe thresholds.

The light source 302 includes a pulsed laser configured to produce, emit, or radiate pulses of light with a certain pulse duration. For example, in some non-limiting embodiments of the present technology, the light source 302 may be configured to emit pulses with a pulse duration (e.g., pulse width) ranging from 10 ps to 100 ns. In other non-limiting embodiments of the present technology, the light source 302 may be configured to emit pulses at a pulse repetition frequency of approximately 100 kHz to 5 MHz or a pulse period (e.g., a time between consecutive pulses) of approximately 200 ns to 10 µs. Overall, however, the light source 302 can generate the output beam 314 with any suitable average optical power, and the output beam 314 may include optical pulses with any suitable pulse energy or peak optical power for a given application.

In some non-limiting embodiments of the present technology, the light source 302 could include one or more laser diodes, including but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode operating in the light source 302 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. It is also contemplated that the light source 302 may include one or more laser diodes that are current-modulated to produce optical pulses.

In some non-limiting embodiments of the present technology, the light source 302 is generally configured to emit the output beam 314 that is a collimated optical beam, but it is contemplated that the beam produced could have any suitable beam divergence for a given application. Broadly speaking, divergence of the output beam 314 is an angular measure of an increase in beam cross-section size (e.g., a beam radius or beam diameter) as the output beam 314 travels away from the light source 302 or the LiDAR system 300. In some non-limiting embodiments of the present technology, the output beam 314 may have a substantially circular cross-section.

It is also contemplated that the output beam 314 emitted by light source 302 could be unpolarized or randomly polarized, could have no specific or fixed polarization (e.g., the polarization may vary with time), or could have a particular polarization (e.g., the output beam 314 may be linearly polarized, elliptically polarized, or circularly polarized).

In at least some non-limiting embodiments of the present technology, the output beam 314 and the input beam 316 may be substantially coaxial. In other words, the output beam 314 and input beam 316 may at least partially overlap or share a common propagation axis, so that the input beam 316 and the output beam 314 travel along substantially the same optical path (albeit in opposite directions). Nevertheless, in other non-limiting embodiments of the present technology, the output beam 314 and the input beam 316 may not be coaxial, or in other words, may not overlap or share a common propagation axis inside the LiDAR system 300, without departing from the scope of the present technology.

It should be noted that in at least some non-limiting embodiments of the present technology, the light source 302 could be rotatable, such as by 360 degrees or less, about the axis of rotation (not depicted) of the LiDAR system 300 when the LiDAR system 300 is implemented in a rotatable configuration. However, in other embodiments, the light source 302 may be stationary even when the LiDAR system 300 is implemented in a rotatable configuration, without departing from the scope of the present technology.

Beam Splitting Element

With continued reference to FIG. 3, there is further provided the beam splitting element 304 disposed in the housing 330. For example, as previously mentioned, the beam splitting element 304 is configured to direct the output beam 314 from the light source 302 towards the scanner unit 308. The beam splitting element 304 is also arranged and configured to direct the input beam 316 reflected off the object 320 to the receiving unit 306 for further processing thereof by the controller 310.

However, in accordance with other non-limiting embodiments of the present technology, the beam splitting element 304 may be configured to split the output beam 314 into at least two components of lesser intensity including a scanning beam (not separately depicted) used for scanning the surroundings 250 of the LiDAR system 300, and a reference beam (not separately depicted), which is further directed to the receiving unit 306.

In other words, in these embodiments, the beam splitting element 304 can be said to be configured to divide intensity (optical power) of the output beam 314 between the scanning beam and the reference beam. In some non-limiting embodiments of the present technology, the beam splitting element 304 may be configured to divide the intensity of the output beam 314 between the scanning beam and the reference beam equally. However, in other non-limiting embodiments of the present technology, the beam splitting element 304 may be configured to divide the intensity of the output beam 314 at any predetermined splitting ratio. For example, the beam splitting element 304 may be configured to use up to 80% of the intensity of the output beam 314 for forming the scanning beam, and the remainder of up to 20% of the intensity of the output beam 314—for forming the reference beam. In yet other non-limited embodiments of the present technology, the beam splitting element 304 may be configured to vary the splitting ratio for forming the scanning beam (for example, from 1% to 95% of the intensity of the output beam 314).

It should further be noted that some portion (for example, up to 10%) of the intensity of the output beam 314 may be absorbed by a material of the beam splitting element 304, which depends on a particular configuration thereof.

Depending on the implementation of the LiDAR system 300, the beam splitting element 304 could be provided in a variety of forms, including but not limited to: a glass prism-based beam splitter component, a half-silver mirror-based beam splitter component, a dichroic mirror prism-based beam splitter component, a fiber-optic-based beam splitter component, and the like.

Thus, according to the non-limiting embodiments of the present technology, a non-exhaustive list of adjustable parameters associated with the beam splitting element 304, based on a specific application thereof, may include, for example, an operating wavelength range, which may vary from a finite number of wavelengths to a broader light spectrum (from 1200 to 1600 nm, as an example); an income incidence angle; polarizing/non-polarizing, and the like.

In a specific non-limiting example, the beam splitting element 304 can be implemented as a fiber-optic-based beam splitter component that may be of a type available from OZ Optics Ltd. of 219 Westbrook Rd Ottawa, Ontario KOA 1L0 Canada. It should be expressly understood that the beam splitting element 304 can be implemented in any other suitable equipment.

Internal Beam Paths

As is schematically depicted in FIG. 3, the LiDAR system 300 forms a plurality of internal beam paths 312 along which the output beam 314 (generated by the light source 302) and the input beam 316 (received from the surroundings 250) propagate. Specifically, light propagates along the internal beam paths 312 as follows: the light from the light source 302 passes through the beam splitting element 304, to the scanner unit 308 and, in turn, the scanner unit 308 directs the output beam 314 outward towards the surroundings 250.

Similarly, the input beam 316 follows the plurality of internal beam paths 312 to the receiving unit 306. Specifically, the input beam 316 is directed by the scanner unit 308 into the LiDAR system 300 through the beam splitting element 304, toward the receiving unit 306. In some implementations, the LiDAR system 300 could be arranged with beam paths that direct the input beam 316 directly from the surroundings 250 to the receiving unit 306 (without the input beam 316 passing through the scanner unit 308).

It should be noted that, in various non-limiting embodiments of the present technology, the plurality of internal beam paths 312 may include a variety of optical components. For example, the LiDAR system 300 may include one or more optical components configured to condition, shape, filter, modify, steer, or direct the output beam 314 and/or the input beam 316. For example, the LiDAR system 300 may include one or more lenses, mirrors, filters (e.g., band pass or interference filters), optical fibers, circulators, beam splitters, polarizers, polarizing beam splitters, wave plates (e.g., half-wave or quarter-wave plates), diffractive elements, microelectromechanical. (MEM) elements, collimating elements, or holographic elements.

It is contemplated that in at least some non-limiting embodiments of the present technology, the given internal beam path and the other internal beam path from the plurality of internal beam paths 312 may share at least some common optical components, however, this might not be the case in each and every embodiment of the present technology.

Scanner Unit

Generally speaking, the scanner unit 308 steers the output beam 314 in one or more directions downrange towards the surroundings 250. The scanner unit 308 is communicatively coupled to the controller 310. As such, the controller 310 is configured to control the scanner unit 308 so as to guide the output beam 314 in a desired direction downrange and/or along a predetermined scan pattern. Broadly speaking, in the context of the present specification "scan pattern" may refer to a pattern or path along which the output beam 314 is directed by the scanner unit 308 during operation.

In certain non-limiting embodiments of the present technology, the controller 310 is configured to cause the scanner unit 308 to scan the output beam 314 over a variety of horizontal angular ranges and/or vertical angular ranges; the total angular extent over which the scanner unit 308 scans the output beam 314 is referred to herein as the field of view (FoV). It is contemplated that the particular arrangement, orientation, and/or angular ranges could depend on the particular implementation of the LiDAR system 300. The field of view generally includes a plurality of regions of interest (ROIs), defined as portions of the FoV which may contain, for instance, objects of interest. In some implementations, the scanner unit 308 can be configured to further investigate a selected region of interest (ROI) 325. The ROI 325 of the LiDAR system 300 may refer to an area, a volume, a region, an angular range, and/or portion(s) of the surroundings 250 about which the LiDAR system 300 may be configured to scan and/or can capture data.

It should be noted that a location of the object 320 in the surroundings 250 of the vehicle 220 may be overlapped, encompassed, or enclosed at least partially within the ROI 325 of the LiDAR system 300.

According to certain non-limiting embodiments of the present technology, the scanner unit 308 may be configured to scan the output beam 314 horizontally and/or vertically, and as such, the ROI 325 of the LiDAR system 300 may have a horizontal direction and a vertical direction. For example, the ROI 325 may be defined by 45 degrees in the horizontal direction, and by 45 degrees in the vertical direction. In some implementations, different scanning axes could have different orientations.

In certain embodiments, the scanner unit 308 includes at least one mirror 309, which will be described in more detail below. In certain embodiments, the scanner unit 308 does not include a galvo mirror. In certain embodiments, the scanner unit 308 does not include wireless rotating components.

In certain non-limiting embodiments of the present technology, the scanner unit 308 may further include a variety of other optical components and/or mechanical-type components for performing the scanning of the output beam 314. For example, the scanner unit 308 may include one or more mirrors, prisms, lenses, MEM components, piezoelectric components, optical fibers, splitters, diffractive elements, collimating elements, and the like. It should be noted that the scanner unit 308 may also include one or more additional actuators (not separately depicted) driving at least some of the other optical components to rotate, tilt, pivot, or move in an angular manner about one or more axes, for example.

The LiDAR system 300 may thus make use of the predetermined scan pattern to generate a point cloud substantially covering the ROI 325 of the LiDAR system 300. As will be described in greater detail herein further below, this point cloud of the LiDAR system 300 may be used to render a multi-dimensional map of objects in the surroundings 250 of the vehicle 220.

As will become apparent from the description provided herein below, in certain non-limiting embodiments of the present technology, the scanner unit 308 of the mirror may be configured to (i) reduce a dead time between transmission of different pulses of light to the ROI 325, and/or (ii) move quickly between different FOVs, such as in a vertical direction.

Receiving Unit

According to certain non-limiting embodiments of the present technology, the receiving unit 306 is communicatively coupled to the controller 310 and may be implemented in a variety of ways. According to the present technology, the receiving unit 306 includes a photodetector, but could include (but is not limited to) a photoreceiver, optical receiver, optical sensor, detector, optical detector, optical fibers, and the like. As mentioned above, in some non-limiting embodiments of the present technology, the receiving unit 306 may be configured to acquire or detects at least a portion of the input beam 316 and produces an electrical signal that corresponds to the input beam 316. For example, if the input beam 316 includes an optical pulse, the receiving unit 306 may produce an electrical current or voltage pulse that corresponds to the optical pulse detected by the receiving unit 306.

It is contemplated that, in various non-limiting embodiments of the present technology, the receiving unit 306 may be implemented with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In some non-limiting embodiments, the receiving unit 306 may also include circuitry that performs signal amplification, sampling, filtering, signal conditioning, analog-to-digital conversion, time-to-digital conversion, pulse detection, threshold detection, rising-edge detection, falling-edge detection, and the like. For example, the receiving unit 306 may include electronic components configured to convert a received photocurrent (e.g., a current produced by an APD in response to a received optical signal) into a voltage signal. The receiving unit 306 may also include additional circuitry for producing an analog or digital output signal that corresponds to one or more characteristics (e.g., rising edge, falling edge, amplitude, duration, and the like) of a received optical pulse.

Controller

Depending on the implementation, the controller 310 may include one or more processors, an application-specific integrated circuit (ASIC), a field-programmable gate array (FPGA), and/or other suitable circuitry. The controller 310 may also include non-transitory computer-readable memory to store instructions executable by the controller 310 as well as data which the controller 310 may produce based on the signals acquired from other internal components of the LiDAR system 300 and/or may provide signals to the other internal components of the LiDAR system 300. The memory can include volatile (e.g., RAM) and/or non-volatile (e.g., flash memory, a hard disk) components. The controller 310 may be configured to generate data during operation and store it in the memory. For example, this data generated by the controller 310 may be indicative of the data points in the point cloud of the LiDAR system 300.

It is contemplated that, in at least some non-limiting embodiments of the present technology, the controller 310 could be implemented in a manner similar to that of implementing the electronic device 210 and/or the computer system 100, without departing from the scope of the present technology. In addition to collecting data from the receiving unit 306, the controller 310 could also be configured to provide control signals to, and potentially receive diagnostics data from, the light source 302 and the scanner unit 308.

As previously stated, the controller 310 is communicatively coupled to the light source 302, the scanner unit 308, and the receiving unit 306. In some non-limiting embodiments of the present technology, the controller 310 may be configured to receive electrical trigger pulses from the light source 302, where each electrical trigger pulse corresponds to the emission of an optical pulse by the light source 302. The controller 310 may further provide instructions, a control signal, and/or a trigger signal to the light source 302 indicating when the light source 302 is to produce optical pulses indicative, for example, of the output beam 314.

Just as an example, the controller 310 may be configured to send an electrical trigger signal that includes electrical pulses, so that the light source 302 emits an optical pulse, representable by the output beam 314, in response to each electrical pulse of the electrical trigger signal. It is also contemplated that the controller 310 may cause the light source 302 to adjust one or more characteristics of output beam 314 produced by the light source 302 such as, but not limited to: frequency, period, duration, pulse energy, peak power, average power, and wavelength of the optical pulses.

By the present technology, the controller 310 is configured to determine a "time-of-flight" value for an optical pulse in order to determine the distance between the LiDAR system 300 and one or more objects in the field of view, as will be described further below. The time of flight is based on timing information associated with (i) a first moment in time when a given optical pulse (for example, of the output beam 314) was emitted by the light source 302, and (ii) a second moment in time when a portion of the given optical pulse (for example, from the input beam 316) was detected or received by the receiving unit 306. In some non-limiting embodiments of the present technology, the first moment may be indicative of a moment in time when the controller 310 emits a respective electrical pulse associated with the given optical pulse; and the second moment in time may be indicative of a moment in time when the controller 310 receives, from the receiving unit 306, an electrical signal generated in response to receiving the portion of the given optical pulse from the input beam 316.

In other non-limiting embodiments of the present technology, where the beam splitting element 304 is configured to split the output beam 314 into the scanning beam (not depicted) and the reference beam (not depicted), the first moment in time may be a moment in time of receiving, from the receiving unit 306, a first electrical signal generated in response to receiving a portion of the reference beam. Accordingly, in these embodiments, the second moment in time may be determined as the moment in time of receiving, by the controller 310 from the receiving unit 306, a second electrical signal generated in response to receiving an other portion of the given optical pulse from the input beam 316.

By the present technology, the controller 310 is configured to determine, based on the first moment in time and the second moment in time, a time-of-flight value and/or a phase modulation value for the emitted pulse of the output beam 314. The time-of-light value T, in a sense, a "round-trip" time for the emitted pulse to travel from the LiDAR system 300 to the object 320 and back to the LiDAR system 300. The controller 310 is thus broadly configured to determine the distance 318 in accordance with the following equation:

$$D = \frac{c \cdot T}{2}, \tag{1}$$

wherein D is the distance 318, T is the time-of-flight value, and c is the speed of light (approximately $3.0 \times 10^8$ m/s).

As previously alluded to, the LiDAR system 300 may be used to determine the distance 318 to one or more other potential objects located in the surroundings 250. By scanning the output beam 314 across the ROI 325 of the LiDAR system 300 in accordance with the predetermined scan pattern, the controller 310 is configured to map distances (similar to the distance 318) to respective data points within the ROI 325 of the LiDAR system 300. As a result, the controller 310 is generally configured to render these data points captured in succession (e.g., the point cloud) in a form of a multi-dimensional map. In some implementations, data related to the determined time of flight and/or distances to objects could be rendered in different informational formats.

As an example, this multi-dimensional map may be used by the electronic device 210 for detecting, or otherwise identifying, objects or determining a shape or distance of potential objects within the ROI 325 of the LiDAR system 300. It is contemplated that the LiDAR system 300 may be configured to repeatedly/iteratively capture and/or generate point clouds at any suitable rate for a given application.

Scanner Unit

With reference to FIGS. 4-13, certain embodiments of the scanner unit 308, according to the present disclosure will now be described in more detail. According to certain embodiments of the present technology, the scanner unit 308 is configured to selectively define different regions of interest 325 within the FOV. By means of certain embodiments, a switching between the different regions of interest 325 can thus be provided in a faster and/or more efficient manner. Furthermore, the scanner unit 308 may enable a scan pattern to be quickly and/or efficiently adapted, which will be described in further detail below. In certain embodiments, the scanner unit 308 reduces or minimizes a dead time between successive output beams 314.

Figure 4:
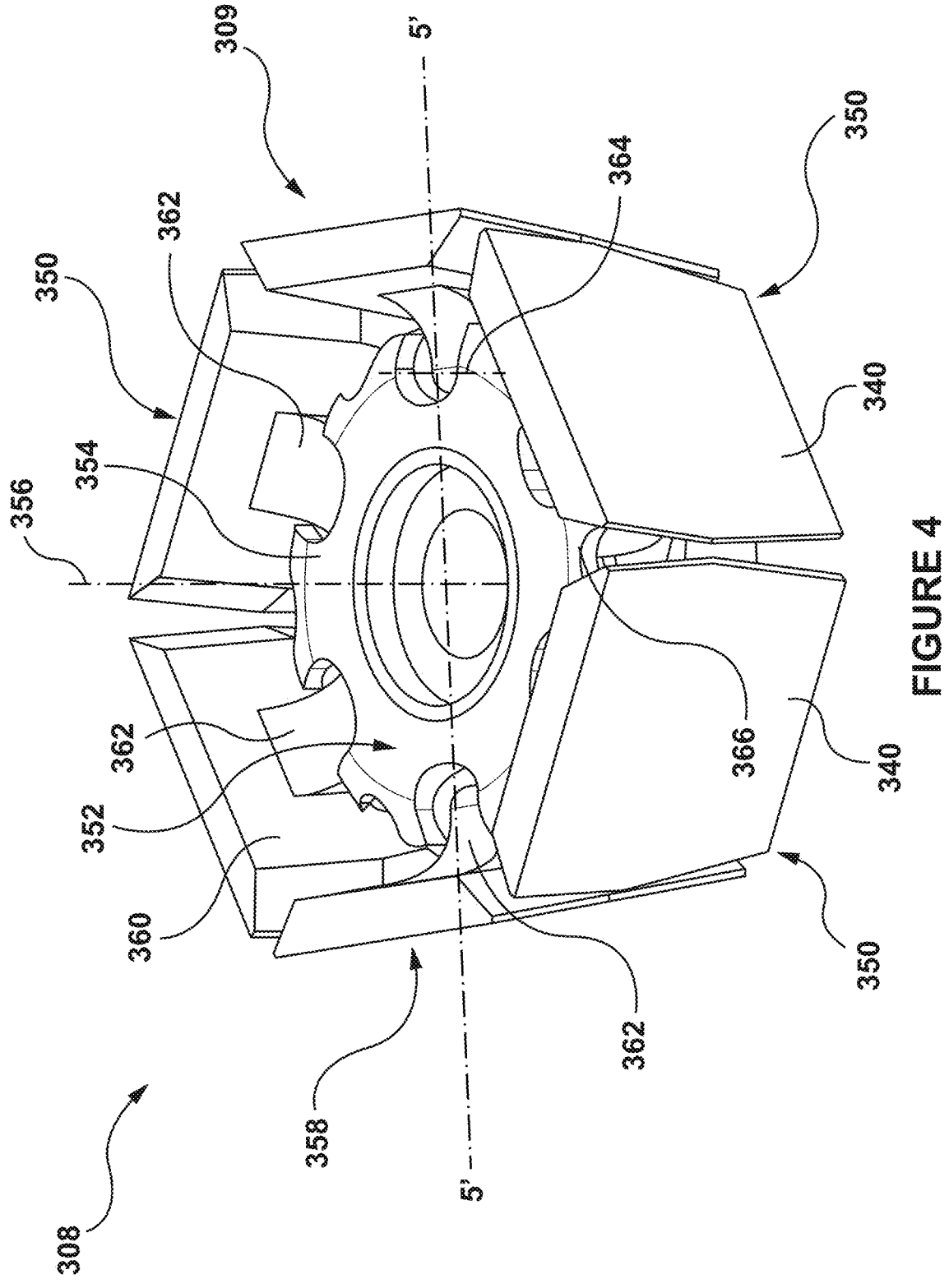
FIG. 4 depicts perspective view of a scanner unit, comprising mirror components, of the LiDAR system of FIG. 3 in accordance with certain non-limiting embodiments of the present technology.
Figure 5:
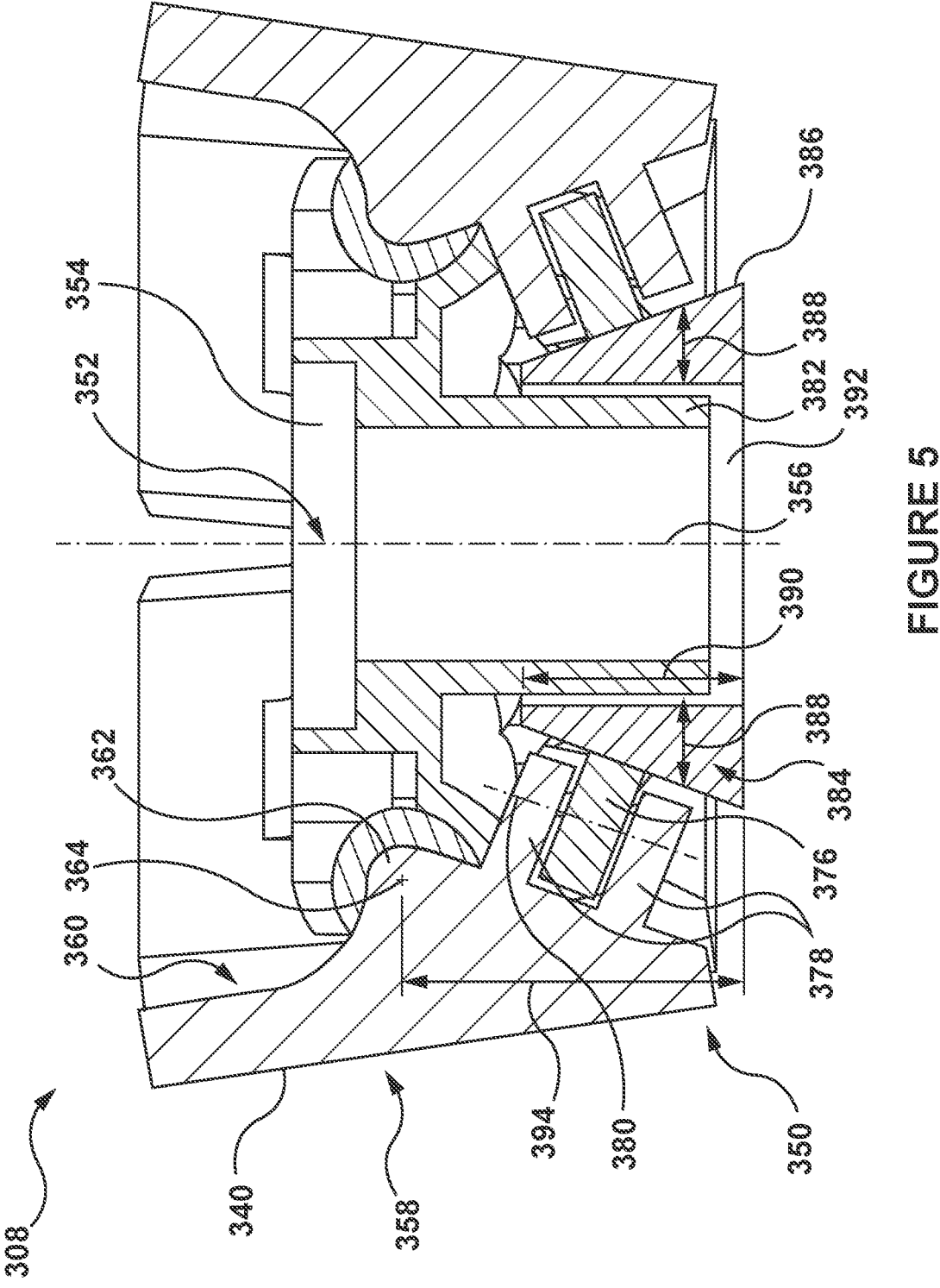
FIG. 5 depicts a cross-sectional view of the scanner unit of FIG. 4 across the line 5'-5' in accordance with certain non-limiting embodiments of the present technology.

Broadly, with reference initially to FIGS. 4 and 5, the scanner unit 308 comprises a plurality of reflective surfaces 340 configured to be moved such that each reflective surface 340 can transmit the output beam 314 as a vertical spread beam 342 along a vertical spread plane 344, and a horizontal spread beam 346 along a horizontal spread plane 348 to define the scan pattern within the FOV. Each reflective surface 340 can be caused to tilt up and down to define the vertical spread beam 342. Each reflective surface 340 can also be caused to be moved in the horizontal spread plane 348 to define the horizontal spread beam 346. Furthermore, sequences of output beams 314 can be caused to be incident on different reflective surfaces 340, which can be configured to generate the same or different spread beam, by coordinating a timing of the horizontal movement of the reflective surfaces and a timing of the output beam 314 transmissions. One or more movement drivers can be provided to cause the movement of the reflective surfaces 340. In certain embodiments, a horizontal movement driver is provided which can cause each reflective surface 340 to be moved in the horizontal spread plane 348 to transmit the horizontal spread beam 346, and a vertical movement driver which can cause each reflective surface 340 to move within the vertical spread plane 344 to define the vertical spread beam 342.

More specifically, each reflective surface 340 is provided on a respective mirror component 350 (such as mirror 309), the scanner unit 308 comprising a plurality of mirror components 350 connected thereto. In certain embodiments, the horizontal movement driver is a rotatable hub component 352 to which the mirror components 350 are attached. The rotatable hub component 352 comprises a hub body 354 which is rotational about a hub rotation axis 356. The plurality of reflective surfaces 340 are positioned, facing outwardly, around the hub component 352. The hub component 352 may be configured to rotate in one or both of a clockwise or anticlockwise direction, about the hub rotation axis 356. A single output beam 314 transmission may be caused to be incident on a plurality of the reflective surfaces 340 by rotation of the hub component 352. By virtue of different tilted positions of the plurality of reflective surfaces 340 in certain embodiments, the spread beam may be caused to quickly and efficiently switch between upper and lower FOV.

In the illustrated embodiments, the scanner unit 308 has six mirror components 350. In other embodiments (not shown), there may be provided two, three, four, five, seven, eight, nine or 10 mirror components 350. In certain embodiments, there are provided at least two mirror components 350.

Each mirror component 350 has a front side 358 and a back side 360. The reflective surface 340 of each mirror component 350 is at the front side 358. At the back side 360 of each mirror component 350, there is provided a connector 362 for attaching the mirror component 350 to the hub component 352 with the respective reflective surface 340 facing outwardly. Each mirror component 350 is connected to the hub component 352 in a manner that permits the mirror component 350 to (i) rotate with the hub component 352 about the hub rotation axis 356, and (ii) to tilt backwards and forwards about a mirror tilt axis 364, the mirror tilt axis 364 being transverse to the hub rotation axis 356, and spaced therefrom. In certain embodiments, the connector 362 permits the mirror component 350 to tilt up and down along one or more parallel tilt planes (FIG. 6), and to rotate within one or more parallel hub rotation planes (FIG. 7) which are substantially transverse to the one or more of the tilt planes. The horizontal movement driver can thus be considered as the hub component 352, rotation of which causes horizontal movement of the mirror component 350.

Figures 6, 7:
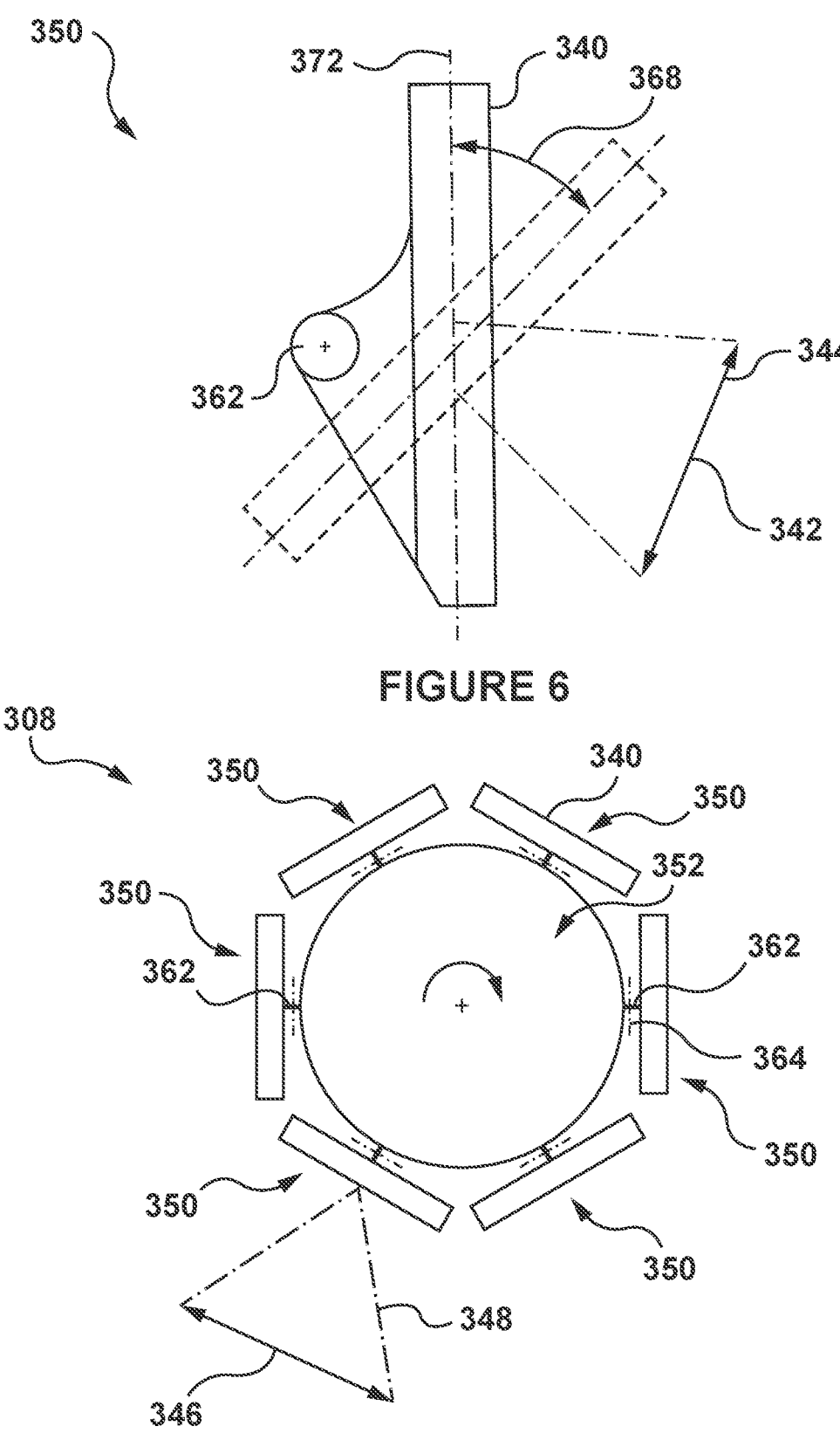
FIG. 6 depicts a side view of one of the mirror components of the scanner unit of FIG. 4 in accordance with certain non-limiting embodiments of the present technology.
FIG. 7 depicts a top plan view of the scanner unit of FIG. 4 in accordance with certain non-limiting embodiments of the present technology.

As best seen in FIGS. 4 and 7, the mirror tilt axis 364 of the plurality of mirror components 350 are positioned about a circular circumference 366 of the hub component 352. The mirror tilt axes 364 of the mirror components 350 lie on the same plane as one another. The connector 362 and the mirror tilt axis 364 are positioned about half way along a length of the reflective surface 340. The mirror component 350 may be caused to move about the mirror tilt axis 364 to define a tilt angle 368 relative to a reference plane 372 (FIG. 6). The tilt angle 368 of each mirror component 350, in use, may be the same or different to one another. Each mirror component 350 has a maximum permissible tilt angle range, within which the tilt angle 368 of each mirror component 350, in use, can be controlled by the controller 310, in a manner that will be explained below.

Figure 8:
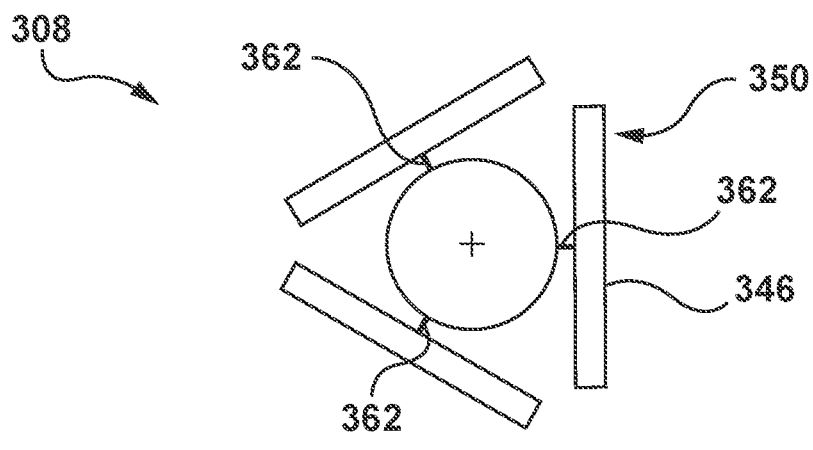
FIG. 8 depicts a top plan view of another embodiment of the scanner unit of FIG. 4 in accordance with certain other non-limiting embodiments of the present technology.
Figure 9:
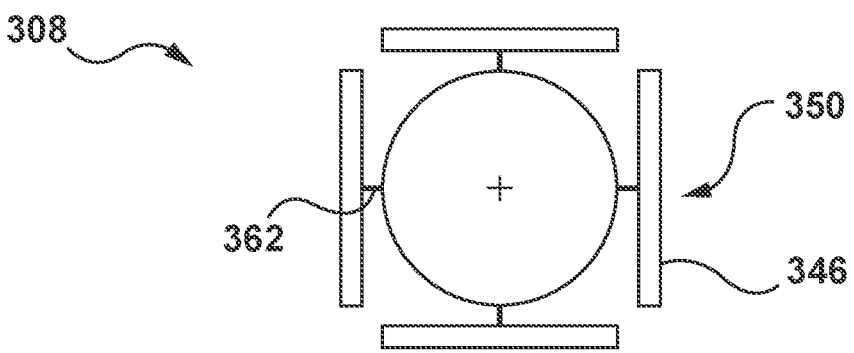
FIG. 9 depicts a top plan view of another embodiment of the scanner unit of FIG. 4 in accordance with certain other non-limiting embodiments of the present technology.
Figure 10:
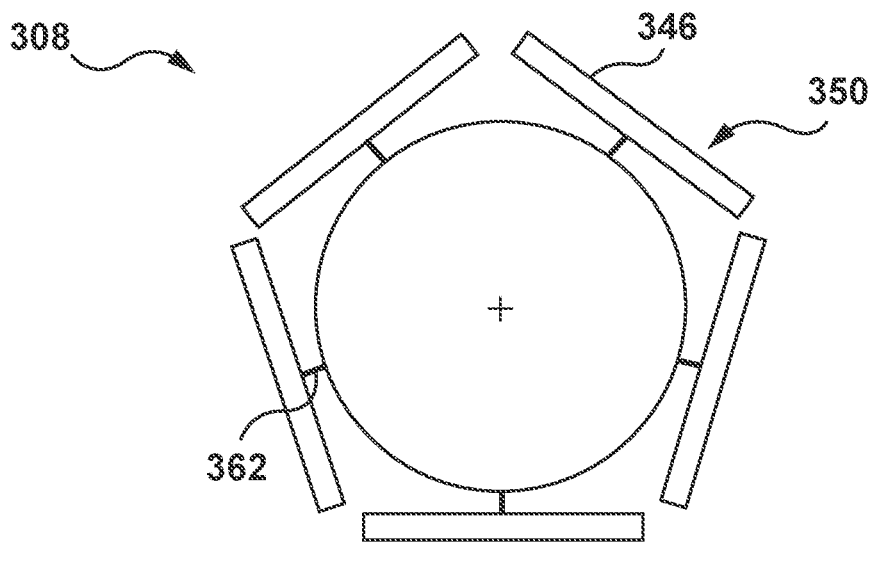
FIG. 10 depicts a top plan view of another embodiment of the scanner unit of FIG. 4 in accordance with certain other non-limiting embodiments of the present technology.
Figure 11:
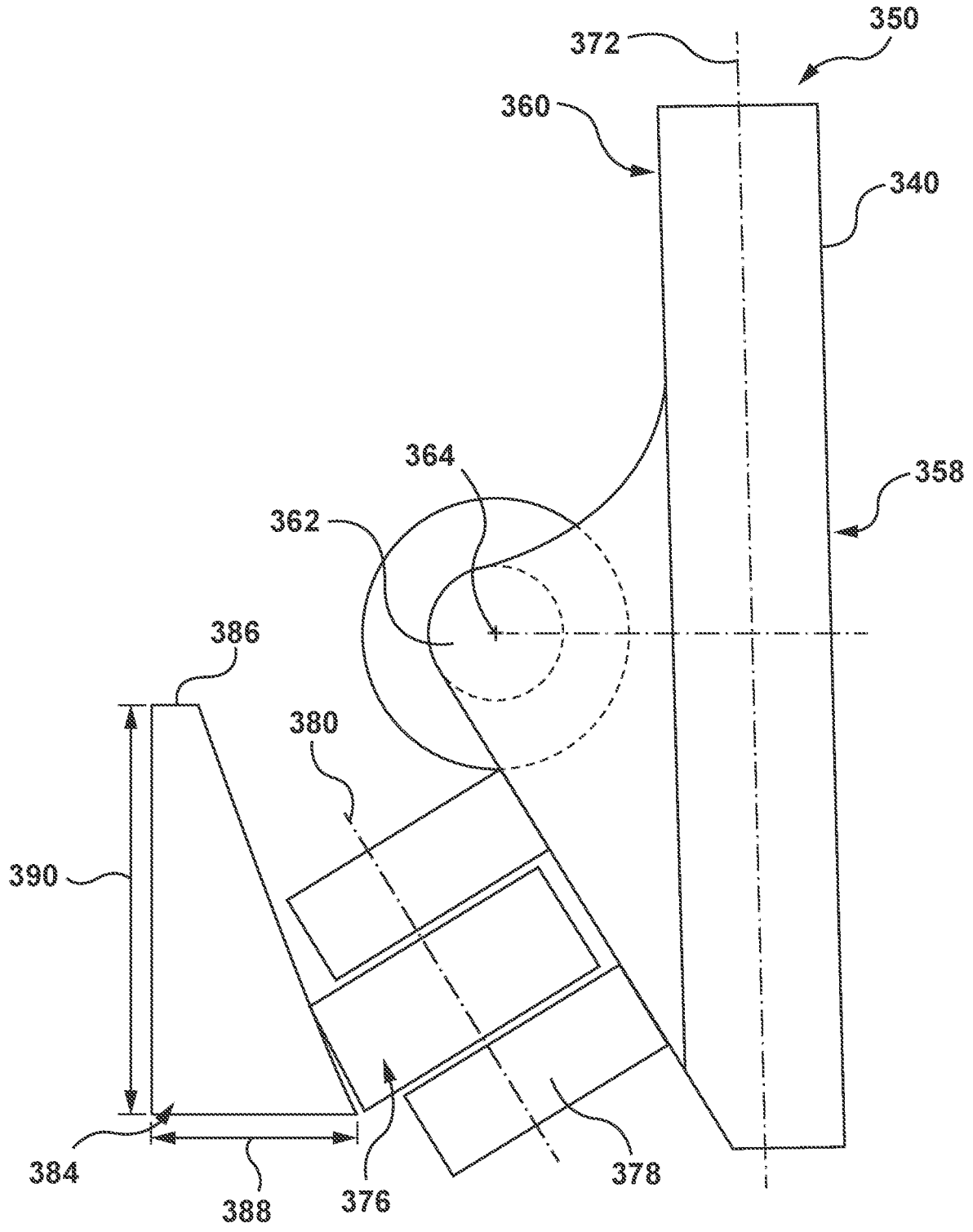
FIG. 11 depicts a side view, in a first position, of a mirror component and a base component of the scanner unit of FIG. 4 in accordance with certain non-limiting embodiments of the present technology.

Turning now to a relative configuration of the reflective surfaces 340 of each mirror component 350 to one another. The reflective surfaces 340 of the six mirror components 350 extend circumferentially about the hub component 353 in a side-by-side configuration with minimal spacing therebetween. As mentioned above, there may be two or more mirror components 350 provided. Various embodiments of scanner units 308 with different numbers of mirror components 350 are illustrated in FIGS. 8-10, in which the mirror components 350 are illustrated in an untilted, neutral position for ease of comparison. By neutral position is meant that the reflective surface 340 is parallel to the reference plane 372. An angle between adjacent reflective surfaces 340 of the mirror components 350 depends on the number of mirror components 350 provided. For a scanner unit 308 with six mirror components 350, the angle between adjacent reflective surfaces is 60°, for a scanner unit 308 with four mirror components 350, the angle between adjacent reflective surfaces is 90°. This angle between the reflective surfaces 340 will determine a rotation needed, by the horizontal movement driver (i.e. the hub component 352), to position a subsequent reflective surface 340 of a subsequent mirror component 350 to the output beam 314 in use (assuming the path of the output beam 314 does not move).

The hub component 352 and the mirror components 350 form a polyhedral configuration with the mirror components 350 defining sides of the polyhedron. With six mirror components 350, the scanning unit 308 resembles a hexagonal prism.

A shape and configuration of each reflective surface 340 is not limited, and each reflective surface 340 may have any suitable shape, size and configuration according to a desired region of interest 325 and scanning pattern. For example, in certain embodiments, each reflective surface 340 is planar. Each reflective surface may have a rectangular, or any other suitable, shape. Each reflective surface 340 may cover the entire front side 358 of the respective mirror component 350, or a portion thereof.

In certain other embodiments (not shown), the reflective surface 340 may be subdivided into sub-reflective surfaces having different reflective properties. There may be provided any number of reflective zones on the mirror component 350. In certain embodiments, the reflective surface 340 may be non-planar (not shown) such as one or more of: curved in a convex manner, curved in a concave manner, and multi-faceted with planar or non-planar facets. The curved surface may be defined by a radius of curvature, or by an arbitrary spline or an equation.

In certain embodiments, the vertical movement driver comprises a reciprocating cone shaped base member, as will be described below with reference to FIGS. 5, and 11-13.

At the back side 360 of each mirror component 350, there is provided a roller 376 connected to the mirror component 350 by a pair of arms 378. The roller 376 is configured to rotate about a roller rotation axis 380. The roller 376 may be made of any suitable material. In certain embodiments, the roller has a surface made of a material having damping properties to reduce or minimize noise (such as a resilient material such as a polymer or a rubber). In certain other embodiments, the roller has a surface configured to provide accuracy of movement, such as a non-resilient material.

At a base 382 of the hub component 352, there is provided a base component 384 positioned circumferentially around the base 382 of the hub component 352, and configured to reciprocate parallel to the hub rotation axis 356. The base component 384 has a surface 386 along which the roller 376 can roll, and to which the roller rotation axis 380 may be parallel. As the hub component 352 rotates in use, the roller 376 is configured to roll along the surface 386.

In certain embodiments, the base component 384 is a truncated cone-shape with a central bore 392 through which the hub component 352 is positioned. The base component 384 is moveable relative to the hub component 352. The base component 384 is configured to move in a direction parallel to the hub rotation axis 356, below a height 394 of the mirror tilt axis 364 to adjust the tilt angle of the reflective surface 340 of the mirror component 350. The base component 384 has a radius 388 which varies along a height 390 of the base component 384, such that reciprocation of the base component 384 relative to the roller 376 causes the reflective surface 340 to pivot about the mirror tilt axis 364 whilst maintaining contact with the surface 386.

Figure 12:
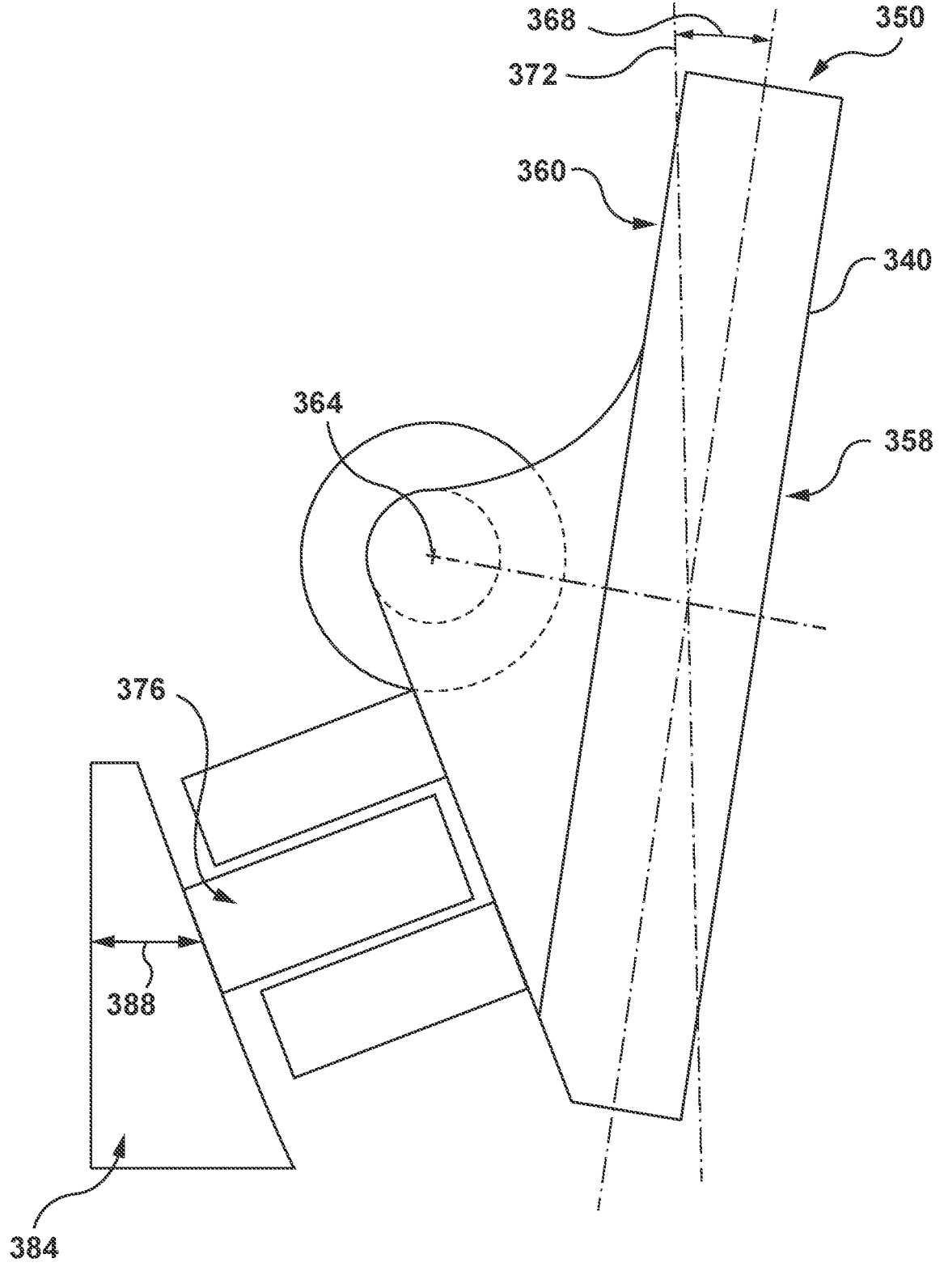
FIG. 12 depicts a side view, in a second position, of the mirror component and the base component of FIG. 11 in accordance with certain non-limiting embodiments of the present technology.
Figure 13:
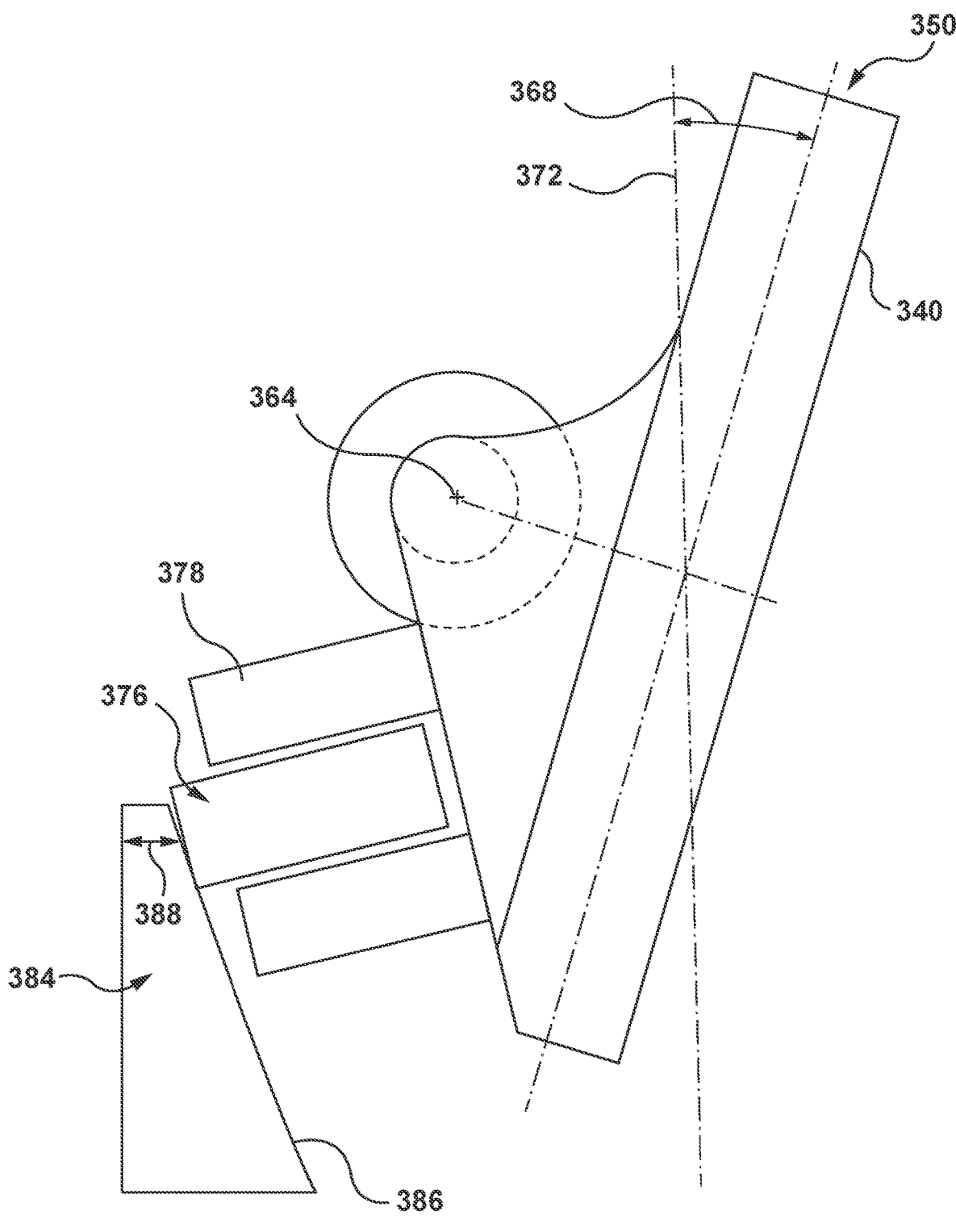
FIG. 13 depicts a side view, in a third position, of the mirror component and the base component of FIG. 11 in accordance with certain non-limiting embodiments of the present technology.

In certain embodiments, the radius 388 of the base component 384 increases along its height 390. As one example, illustrated in FIGS. 11-13, at a neutral tilt position (FIG. 11), the base component 384 is at an uppermost position, corresponding to a largest radius. When the base component 384 is moved downwardly from the neutral tilt position, the roller 376 moves along the surface 386 of the base component 384 with decreasing radius 388 causing the mirror component 350 to tilt downwardly (FIG. 12). When the roller 376 contacts the smallest radius 388 of the base component 384 at a lowermost position, the tilt angle of the reflective surface 340 is at a maximum downward tilt (FIG. 13).

Therefore, in certain embodiments, the tilt angle 368 of the mirror component 350 can be defined based a position of the base component 384. In the embodiment illustrated in FIGS. 11-13, the mirror component 350 is configured to move between the neutral position (in which the tilt angle 368 relative to the reference plane 372 is zero degrees), and a downwardly tilted position. In other embodiments, the tilt angle 368 may encompass other positions of the mirror component 350 such as an upwardly tilted position. The tilt angle 368 may comprise about 40°, such as about 15° above the neutral position and about 25° below the neutral position.

It will be appreciated that the base component 384 may be configured to reciprocate up and down within a maximum range of movement, or within a sub-range of that maximum range. In other words, the tilt angle 368 of the mirror component 350 induced by movement of the base component 384 may be any sub-range within a maximum permissible range.

In certain embodiments, the base component 384 may comprise a surface pattern of variable height. For example, the surface pattern of the base component 384 may comprise an undulating height pattern on the conical shape base component. As the hub component rotates, the mirror component 350 is caused to move according to the undulations as well as base component 384 radius.

In certain embodiments, the base component 384 is caused to move up and down such that a first subset of the reflective surfaces have a first tilt angle, and a second subset of the reflective surfaces has a second tilt angle. The first tilt angle and the second tilt angle may be different from one another. In certain embodiments, the first subset of the reflective surfaces 340 comprises a pair or a triplet of the reflective surfaces 340 which are not adjacent to one another. In certain embodiments, the second subset of the reflective surfaces 340 comprises a pair or a triplet of the reflective surfaces 340 which are not adjacent to one another. In certain embodiments, the first subset of the reflective surfaces 340 and the second subset of the reflective surfaces are alternately positioned around the hub component 352.

In the embodiments described above, the scanner unit 308 is configured such that the output beam 314 is received on a given reflective surface 340 which has a predetermined tilt angle 368 relative to a reference plane 372. In other embodiments, the scanner unit 308 is configured such that the output beam is received on a given reflective surface 340 whilst the mirror component 350 is pivoting about the mirror tilt axis 364. In these embodiments, the reflective surface 340 can be considered to present a predetermined tile angle range to the output beam 314. The movement of the reflective surface 340 is being caused by the reciprocation of the base component 384.

In certain other embodiments, the vertical movement driver comprises any other mechanism that can cause the mirror component 350 to pivot about the mirror tilt axis 364.

For example, in certain embodiments, the vertical movement driver comprises a voice coil actuator (not shown) comprising a coil assembly and a permanent magnet. Current flowing through the coil assembly generates a force perpendicular to the direction of the current on interaction with the magnetic force of the permanent magnet, which force causes the mirror component 350 to move.

In certain embodiments, the vertical movement driver comprises an arm powered by a motor (not shown), which can contact the mirror component 350 to cause it to move about the mirror tilt axis 364. The arm that contacts the mirror component 350 may be an arm whose length can be extended, or an arm of fixed length.

The vertical and/or horizontal movement drivers may be communicatively coupled to the controller 310, or other controllers, for control of the movement of the mirror component 350. In certain embodiments, the hub component 352 is coupled to the controller 310 which can control the rotation movement of the hub component 310, and the base component 384 is coupled to the controller 310 which can control the reciprocating movement of the base component 384.

In certain embodiments, the controller 310, which is communicatively coupled to the light source 302 as well as the vertical and/or horizontal movement drivers of the scanner unit 308, is configured to cause relative movement between the output beam 314 and the scanner unit 308 for selective contact of the given output beam 314 with a given reflective surface to emit a given horizontal spread beam 346 and a given vertical spread beam 342 for a desired scanning pattern in the region of interest 325.

In this respect, the controller 310 is configured to move the hub component 352 to present a given reflective surface 340 to the output beam 314 at a given rotation speed which can determine the horizontal spread beam 346, and to move the base component 384 to provide the reflective surface 340 on which the output beam 314 is incident with a given tilt angle range 368 to define a given vertical spread beam 342.

In certain embodiments, the controller 310 may be configured to determine a sequence of reflective surfaces 340 and tilt angle ranges in order to generate a predetermined scan pattern. This may be conducted, such as by the controller 310, using determined relationships between one or more parameters such as: a relation between the base component 384 position and the tilt angle range 368; a relation between a speed of rotation of the hub component 352 and the horizontal spread beam 346.

In certain other embodiments, the controller 310 may be configured to cause the scanner unit 308 to generate a given scan pattern based on one or more triggers, such as a determination, in any manner, that a scan of a given region of interest within the FOV is required.

One such example of this scenario is on detection by the LiDAR system 300 of an unidentified object in one area of the FOV of the vehicle 220, warranting further investigation. Another such example is after an unidentified object is detected after a non-detailed scan (e.g. debris on the road). In that case, the controller 310 may determine that the region(s) of interest in which the debris is located should be scanned, and cause contact between the output beam 314 and the given reflective surface 340.

In certain other embodiments, the trigger for generating the given scan pattern comprises a predetermined geographical trigger. The controller 310 may determine a presence of the predetermined geographical trigger such as GPS location, etc. For example, the predetermined geographical trigger may comprise a location of a known danger spot such as, but not limited to, a sharp turn in a road, a steep incline, a steep decline, a blind turn, a windy crossing, a school crossing, an animal crossing, a notoriously busy junction, an area with tall buildings, an area without tall buildings. The controller 310 may be configured to generate the predetermined scan based on a given predetermined geographical trigger. For example, at a school crossing, the output beam 314 may be caused to generate a scanning pattern pertinent to children's heights and speed of movement. In another example, when the vehicle 220 is located in an area without tall buildings, the controller 310 may be caused to generate a scanning pattern which is lower down in the FOV.

In certain other embodiments, the trigger for generating the given scan pattern comprises a predetermined environmental trigger, for example, on determination by a sensor of a certain environmental condition, such as heavy rain.

The controller 310 is configured to execute a method 1000 for operating a LiDAR system, such as the LiDAR system 300, or a scanner unit of a LiDAR system such as the scanner unit 308, in a manner which can switch between different ROIs within the FOV, to detect objects in different parts of the surroundings of the vehicle 220, in certain embodiments.

Computer-Implemented Methods

With reference now to FIG. 14, there is depicted a flowchart of a method 1000 for generating a scan pattern in a region of interest by a scanner of a LIDAR system of an autonomous vehicle, according to the non-limiting embodiments of the present technology. The method 1000 may be executed by the controller 310.

STEP 1010: Causing Rotation of a Hub Component, about a Hub Rotation Axis, to which is Attached at Least Three Mirror Components, Each Mirror Component Having a Reflective Surface Facing Outwardly from the Hub Component, to Position a Given One of the at Least Three Mirror Components so that an Emitted Light Beam from the LIDAR System is Incident on the Given One Mirror Component to Transmit a Horizontal Spread Beam The method 1000 comprises causing a hub component of a scanner unit, such as the hub component 352 of the scanner unit 308 to rotate about a hub rotation axis such as the hub rotation axis 356. The scanner unit 308 comprises the at least three mirror component 350 attached to the hub component 352 and configured to rotate with the hub component 352. Each mirror component 350 has a reflective surface 340 facing outwardly from the hub component 352. In the step 1010, rotation of the hub component 352 positions a given one of the at least three mirror components 350 so that an output beam 315 of the LIDAR system is incident on the reflective surface 340 of the given one mirror component 350. The output beam 314 is then transmitted as a spread beam, including a horizontal spread beam, such as the horizontal spread beam 346.

The method 1000 may further comprise the controller 310 causing a radiation source of the LIDAR system, such as the light source 302 to emit the output beam 314 along an internal emission pathway of the LIDAR system. The LIDAR system may comprise an embodiment of the LiDAR system 300.

STEP 1020: The Controller Causing a Tilting of the Given One Mirror Component, Relative to the Hub Component, by a Predetermined First Tilt Angle to Transmit a First Vertical Spread Beam The method 1000 includes step 1020 in which the controller 310 causes a tilting of the given one mirror component 350, relative to the hub component 352, by a first tilt angle, to transmit a first vertical spread beam. The controller 310 may further comprise causing a further rotation of the hub component 352 about the hub rotation axis 356 to position a given other one of the at least three mirror components 350 so that another emitted light beam from the LIDAR system is incident on the given other one of the at least three mirror components 350. The given other one of the at least three mirror components 350 may comprise a predetermined second tilt angle to transmit a second vertical spread beam. In this respect, the method 1000 may include the controller 310 further comprising causing a tilting of the given other one mirror component 350, relative to the hub component 352, by the predetermined second tilt angle to transmit the second vertical spread beam. The predetermined first tilt angle and the predetermined second tilt angle may be the same or different.

The method 1000 may include the controller 310 coordinating the emission of the light beam with the rotation of the hub component 352 so that sequential light beams are incident on different mirror components 350.

The scanner unit 308 may include the base component 384 which is configured to move up and down within a certain linear range to cause the mirror component 350 to tilt within a certain maximum permissible tilt range. In this respect, the method 1000 may further comprise the controller 310 causing the base component 384 to reciprocate within a first linear range to cause the given one of the at least three mirror components 350 to tilt within the first tilt angle range.

Figure 15:
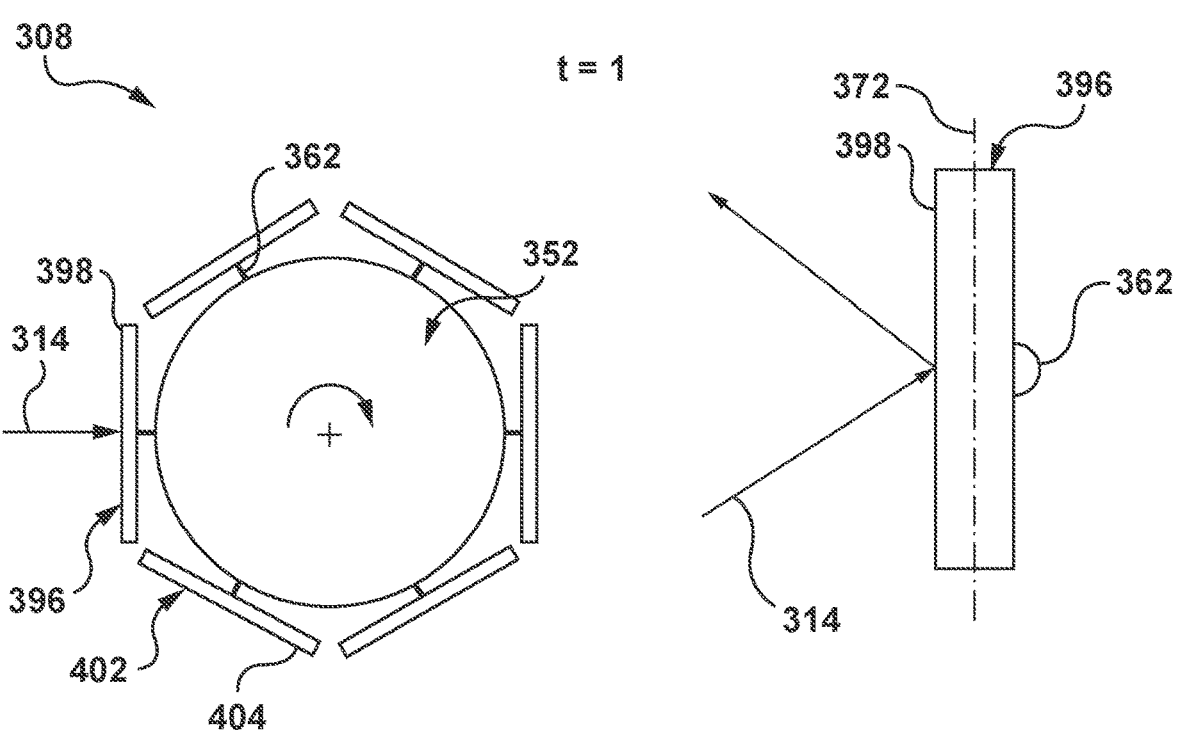
FIG. 15 depicts, on the left, a top plan view of the embodiment of the scanner unit of FIG. 4 in a first position, and, on the right, a side view of one of the mirror components of the scanner unit, in accordance with various non-limiting embodiments of the present technology.
Figure 16:
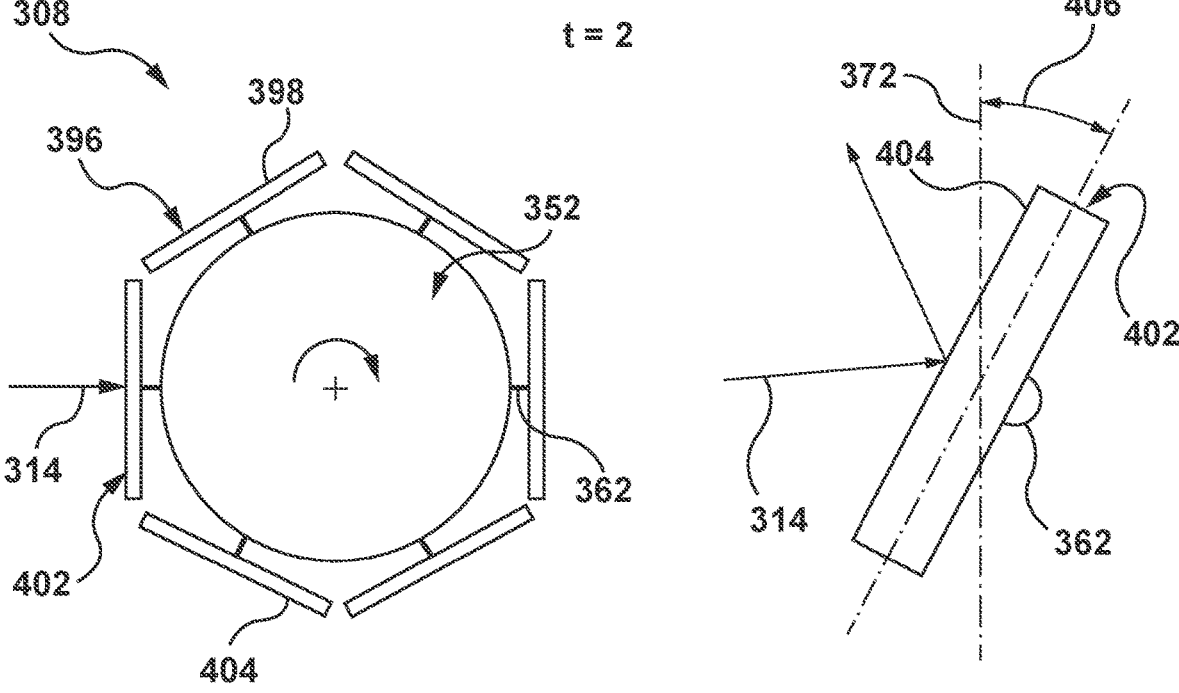
FIG. 16 depicts, on the left, a top plan view of the embodiment of the scanner unit of FIG. 4 in a second position, and, on the right, a side view of another one of the mirror components of the scanner unit, in accordance with various non-limiting embodiments of the present technology.

FIGS. 15 and 16 illustrate certain embodiments in which the scanner unit 308 comprises six mirror components 350 and is in a first and second position respectively. After the controller 310 causes the rotation of the hub component 352, at t=1 (first position) shown in FIG. 15, the given one of the six mirror components 396 is positioned such that the output beam 314 is incident on the respective reflective surface 398 (left hand side image which shows a top plan view of the hub component 352 and six mirror components 350), and with the predetermined first tilt angle relative to the reference plane 372 at zero degrees (right hand side view). At t=2 (second position), shown in FIG. 16, the given other one of the six mirror components 402 is positioned such that the output beam 314 is incident on the respective reflective surface 404 (left hand side view), and with the predetermined second tilt angle 406 (right hand side view) which is different than the first tilt angle.

In another embodiment (not shown), the base component 384 is caused to move such that the first subset of the reflective surfaces 398 has a different tilt angle or tilt angle range compared to the tilt angle or the tilt angle range of the second subset of the reflective surfaces 398. This may be caused to occur within a single output beam 314 transmission. The first and second subsets may be positioned alternately around the hub component, or in any other predetermined pattern. The tilt angles of the reflective surfaces may be caused to alternately emit spread beams in upper and lower portions of the FOV causing a fast switching between the upper and lower portions. Adjacent reflective surfaces which are caused to have different tilt angles or tilt angle ranges may be directed to one or other of upper and lower portions of the FOV. When two adjacent reflective surfaces are provided, these may be considered as a "pair" of reflective surfaces for consecutively directing the spread beam to different parts of the FOV, such as upper and lower portions of the FOV. In other embodiments, there may be provided three adjacent reflective surfaces, which can be considered a "triplet", each of which directs the spread beam to different part of the FOV. In this way, fast switching between different parts of the FOV can be achieved.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. Scanner for a LIDAR system of an autonomous vehicle, the scanner comprising:
   a hub component comprising a hub body which is rotational about a hub rotation axis;
   at least three mirror components moveably connected to the hub component, a given mirror component of the at least three mirror components having:
      a front side having a reflective surface for directing incident light beams;
      a back side having a connector for attaching the given mirror component to the hub component with the respective reflective surfaces facing outwardly, the connector configured to permit the given mirror component to rotate with the hub component and to permit the given mirror component to tilt along a mirror tilt axis which is transverse to the hub rotation axis; and
   a vertical movement driver for changing a tilt angle about the mirror tilt axis of each mirror component of the at least three mirror components, the vertical movement driver being configured to change the tilt angle of each mirror component, the vertical movement driver comprising:

a base component, having a radius which varies along its length, positioned circumferentially around a base of the hub component, the base component configured to reciprocate parallel to the hub rotation axis whilst being in contact with the back side of each of the at least three mirror components, to move the at least three mirror components about their respective mirror tilt axes as the base component reciprocates.

2. The scanner of claim 1, wherein the hub component and the at least three mirror components form a polyhedral configuration with the at least three mirror components forming at least three sides of the polyhedron.

3. The scanner of claim 1, wherein respective reflective surfaces of the at least three mirror components have a side-by-side configuration when connected to the hub component and are angled with respect to one another.

4. The scanner of claim 1, wherein the at least three mirror components are positioned circumferentially with respect to the hub component about the hub rotation axis.

5. The scanner of claim 1, wherein the respective mirror tilt axes of the at least three mirror components are positioned about a circumference of the hub component and lie on the same plane.

6. The scanner of claim 1, wherein the connector of each mirror component of the at least three mirror components forms part of a hinge joint.

7. The scanner of claim 1, wherein the at least three mirror components comprise six mirror components positioned circumferentially about the hub component to form a hexagonal prism configuration having six sides, with the reflective surfaces of the six mirror components forming the six sides of the hexagonal prism.

8. The scanner of claim 1, further comprising a roller provided at the back side of each of the at least three mirror components, the roller arranged to rotate about a roller rotation axis, and along a surface of the base component when the hub component rotates.

9. The scanner of claim 1, wherein the base component is cone shaped and has a diameter at a lower end which is wider than the diameter at a higher end, such that moving the base component upwardly, causes the tilt angle, relative to a reference plane, of the mirror component to increase.

10. The scanner of claim 1, wherein the hub component is communicatively coupled to a controller of the LIDAR system, the controller configured to control the rotation of the hub component.

11. The scanner of claim 1, wherein the vertical movement driver is communicatively coupled to a controller of the LIDAR system, the controller configured to control a movement of the vertical movement driver which can cause the mirror component to tilt about the mirror tilt axis.

12. The scanner of claim 1, wherein the base component is communicatively coupled to a controller of the LIDAR system, the controller configured to control the reciprocating movement of the vertical movement driver which can cause the mirror component to tilt about the mirror tilt axis.

13. A LIDAR system for detecting objects in a surrounding environment of an autonomous vehicle, the LIDAR system comprising:
    a hub component comprising a hub body which is rotational about a hub rotation axis;
    at least three mirror components moveably connected to the hub component, a given mirror component of the at least three mirror components having:
        a front side having a reflective surface for directing incident light beams; and a back side having a connector for attaching the given mirror component to the hub component with the respective reflective surfaces facing outwardly, the connector configured to permit the given mirror component to rotate with the hub component and to permit the given mirror component to tilt along a mirror tilt axis which is transverse to the hub rotation axis; and
    a vertical movement driver for changing a tilt angle about the mirror tilt axis of each mirror component of the at least three mirror components, the vertical movement driver being configured to change the tilt angle of each mirror component, the vertical movement driver comprising:
        a base component, having a radius which varies along its length, positioned circumferentially around a base of the hub component, the base component configured to reciprocate parallel to the hub rotation axis whilst being in contact with the back side of each of the at least three mirror components, to move the at least three mirror components about their respective mirror tilt axes as the base component reciprocates.

14. The LIDAR system of claim 13, further comprising a controller communicatively coupled to the scanner, the controller configured to cause rotation of the hub component about the rotation axis and/or tilting movement of the at least three mirror components about the respective mirror tilt axis.

15. A method of generating a scan pattern in a region of interest by a scanner of a LIDAR system of an autonomous vehicle, the method executed by a controller of the LIDAR system which is communicatively coupled to the scanner, the method comprising:
    the controller causing rotation of a hub component, about a hub rotation axis, to which is attached at least three mirror components, each mirror component having a reflective surface facing outwardly from the hub component, to position a given mirror component of the at least three mirror components so that an emitted light beam from the LIDAR system is incident on the given one mirror component to transmit a horizontal spread beam;
    the controller causing a tilting of the given mirror component, relative to the hub component, by a predetermined first tilt angle to transmit a first vertical spread beam,
        the tilting comprising using a vertical movement driver for changing a tilt angle about a respective mirror tilt axis of each mirror component of the at least three mirror components, the vertical movement driver being configured to change the tilt angle of each mirror component, the vertical movement driver comprising:
            a base component, having a radius which varies along its length, positioned circumferentially around a base of the hub component, the base component configured to reciprocate parallel to the hub rotation axis whilst being in contact with the back side of each of the at least three mirror components, to move the at least three mirror components about their respective mirror tilt axes as the base component reciprocates.

16. The method of claim 15, the controller further comprising causing a further rotation of the hub component about the hub rotation axis to position a given other one of the at least three mirror components so that another emitted light beam from the LIDAR system is incident on the given other one of the at least three mirror components.

17. The method of claim 16, the controller further comprising causing a tilting of the given other one mirror component, relative to the hub component, by a predetermined second tilt angle to transmit a second vertical spread beam, wherein the predetermined first tilt angle and the predetermined second tilt angle may be the same or different.

* * * * *